US008707582B2

(12) United States Patent
Klassen et al.

(10) Patent No.: US 8,707,582 B2
(45) Date of Patent: Apr. 29, 2014

(54) ENERGY STORAGE AND RETURN SPRING

(76) Inventors: James B. Klassen, Langley (CA); David W. Boehm, Summerland (CA)

( * ) Notice: Subject to any disclaimer, the term of this patent is extended or adjusted under 35 U.S.C. 154(b) by 1367 days.

(21) Appl. No.: 12/130,079

(22) Filed: May 30, 2008

(65) Prior Publication Data

US 2009/0064536 A1    Mar. 12, 2009

Related U.S. Application Data

(60) Provisional application No. 60/970,263, filed on Sep. 6, 2007, provisional application No. 60/992,920, filed on Dec. 6, 2007, provisional application No. 61/016,555, filed on Dec. 24, 2007, provisional application No. 61/016,558, filed on Dec. 24, 2007, provisional application No. 61/024,898, filed on Jan. 30, 2008.

(51) Int. Cl.
*A43B 13/28* (2006.01)
*A43B 3/10* (2006.01)
*F16F 1/34* (2006.01)
*F16F 1/20* (2006.01)

(52) U.S. Cl.
USPC ............... 36/27; 36/7.8; 267/161; 267/164

(58) Field of Classification Search
USPC ............. 36/27, 7.8; 267/161, 162, 164
See application file for complete search history.

(56) References Cited

U.S. PATENT DOCUMENTS

| | | | | |
|---|---|---|---|---|
| 1,613,538 A | * | 1/1927 | Schad | 36/7.8 |
| 1,726,028 A | * | 8/1929 | Keller | 36/7.8 |
| 2,408,617 A | * | 10/1946 | Ferrar | 36/7.8 |
| 2,630,897 A | * | 3/1953 | Porter | 192/89.23 |
| 3,029,071 A | * | 4/1962 | Wells | 267/161 |
| 3,107,766 A | * | 10/1963 | Pritchard | 192/89.1 |
| 3,489,402 A | * | 1/1970 | Cobley | 267/152 |
| 4,342,158 A | * | 8/1982 | McMahon et al. | 36/35 R |
| 4,492,046 A | | 1/1985 | Kosova | |
| 4,592,153 A | * | 6/1986 | Jacinto | 36/38 |
| 4,638,575 A | * | 1/1987 | Illustrato | 36/38 |

(Continued)

FOREIGN PATENT DOCUMENTS

| | | |
|---|---|---|
| CA | 2024402 | 3/1992 |
| CA | 2206433 | 6/1996 |
| DE | 202006007302 | 8/2006 |
| WO | 81/03602 | 12/1981 |

OTHER PUBLICATIONS

Z-CoiL Footwear. "Z-CoiL Footwear Gains ANSI and CSA Certification", www.zcoil.com, accessed Feb. 27, 2006.

(Continued)

*Primary Examiner* — Joshua J Michener
*Assistant Examiner* — Devin Barnett
(74) *Attorney, Agent, or Firm* — Scott D. Swanson; Dykas & Shaver

(57) ABSTRACT

A spring shoe, and also in particular a spring, as well as a method of returning energy to a user, are provided. In one embodiment, a method and apparatus stores foot strike energy and releases it after a slight delay, when it will exert a force on the user which includes a forward component. This is accomplished in an embodiment by a spring in the sole which has a decreasing spring force, such that the force required to compress the sole decreases for all or part of the compression displacement as the spring is compressed.

26 Claims, 25 Drawing Sheets

(56) References Cited

U.S. PATENT DOCUMENTS

| | | | |
|---|---|---|---|
| 4,680,876 A * | 7/1987 | Peng | 36/35 B |
| 4,843,737 A | 7/1989 | Vorderer | |
| 4,894,934 A * | 1/1990 | Illustrato | 36/37 |
| 4,967,734 A | 11/1990 | Rennex | |
| 5,282,325 A * | 2/1994 | Beyl | 36/27 |
| 5,343,637 A | 9/1994 | Schindler | |
| 5,367,790 A | 11/1994 | Gamow et al. | |
| 5,435,079 A | 7/1995 | Gallegos | |
| 6,029,374 A | 2/2000 | Herr et al. | |
| 6,050,557 A * | 4/2000 | Shimoseki | 267/162 |
| 6,282,814 B1 | 9/2001 | Krafsur et al. | |
| 6,434,859 B1 * | 8/2002 | Kim | 36/43 |
| 6,553,692 B1 * | 4/2003 | Chung | 36/37 |
| 6,684,531 B2 | 2/2004 | Rennex | |
| 6,996,922 B2 * | 2/2006 | Ryoo | 36/7.8 |
| 6,996,924 B2 * | 2/2006 | Meschan | 36/25 R |
| 7,089,690 B2 * | 8/2006 | Krstic | 36/29 |
| 7,219,449 B1 | 5/2007 | Hoffberg | |
| 7,278,226 B2 * | 10/2007 | Holden et al. | 36/35 R |
| 7,290,354 B2 | 11/2007 | Perenich | |
| 7,401,419 B2 | 7/2008 | Lucas et al. | |
| 7,726,042 B2 * | 6/2010 | Meschan | 36/27 |
| 7,757,411 B2 * | 7/2010 | Nakano | 36/37 |
| 7,937,853 B2 * | 5/2011 | Kwon et al. | 36/27 |
| 7,950,166 B1 * | 5/2011 | Perenich | 36/27 |
| 2002/0022798 A1 * | 2/2002 | Connelly et al. | 604/93.01 |
| 2002/0144430 A1 | 10/2002 | Schmid | |
| 2003/0121178 A1 * | 7/2003 | Rennex | 36/27 |
| 2003/0126760 A1 * | 7/2003 | LeVert et al. | 36/27 |
| 2003/0188455 A1 | 10/2003 | Weaver, III | |
| 2003/0192200 A1 * | 10/2003 | Dixon | 36/27 |
| 2004/0069589 A1 * | 4/2004 | Pahrisch et al. | 192/89.25 |
| 2005/0005472 A1 * | 1/2005 | Perenich | 36/27 |
| 2005/0102858 A1 * | 5/2005 | Yen | 36/28 |
| 2005/0151310 A1 | 7/2005 | Rodeffer | |
| 2005/0262725 A1 * | 12/2005 | Rennex et al. | 36/7.8 |
| 2006/0021262 A1 * | 2/2006 | Killion et al. | 36/136 |
| 2007/0119074 A1 | 5/2007 | Aveni et al. | |
| 2007/0271818 A1 | 11/2007 | Rabushka | |
| 2007/0294915 A1 * | 12/2007 | Ryu et al. | 36/28 |
| 2008/0016716 A1 * | 1/2008 | Battaglino | 36/7.8 |
| 2008/0256827 A1 * | 10/2008 | Hardy et al. | 36/27 |
| 2008/0313928 A1 * | 12/2008 | Adams et al. | 36/103 |
| 2009/0056165 A1 * | 3/2009 | Lee | 36/88 |
| 2010/0251571 A1 * | 10/2010 | Woodard | 36/103 |
| 2011/0314695 A1 * | 12/2011 | Tsai | 36/27 |

OTHER PUBLICATIONS

Spira, "The Future is Now. WaveSpring™ Technology is here and it is coming to a show near you!", www.spira.com/technology, accessed Dec. 15, 2007.

* cited by examiner

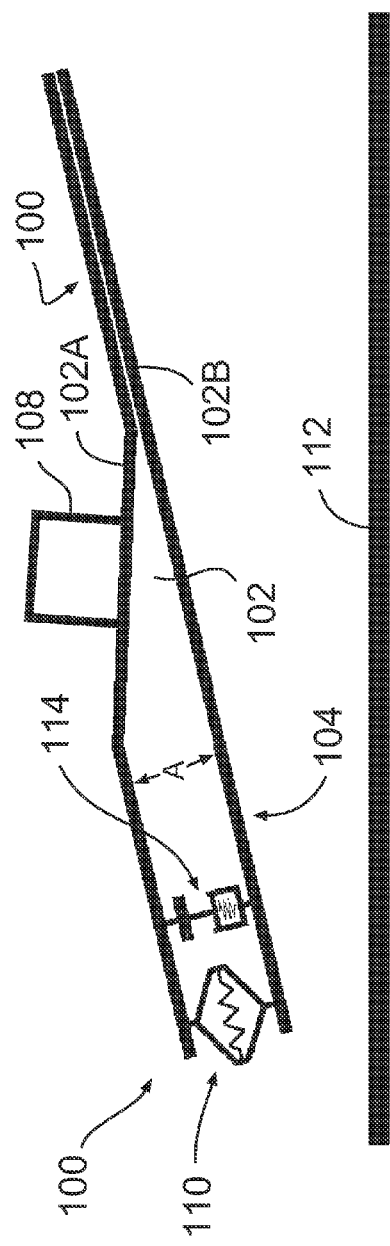
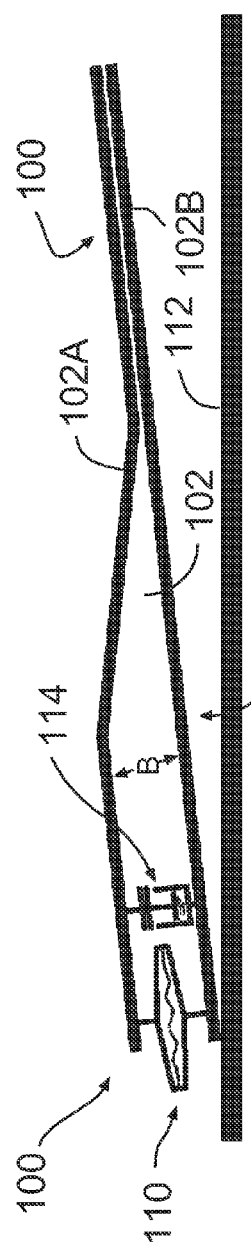
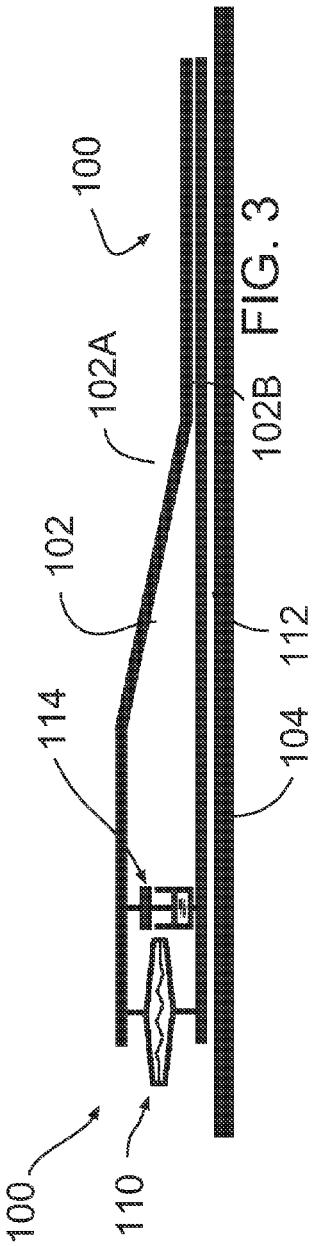

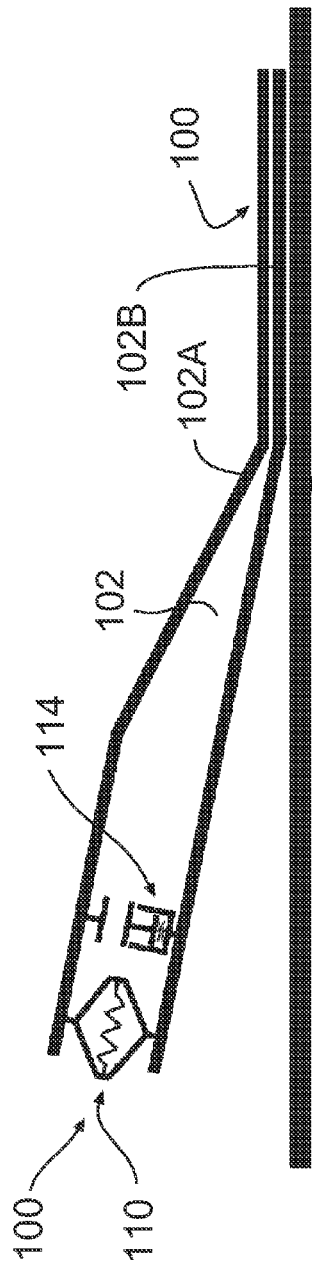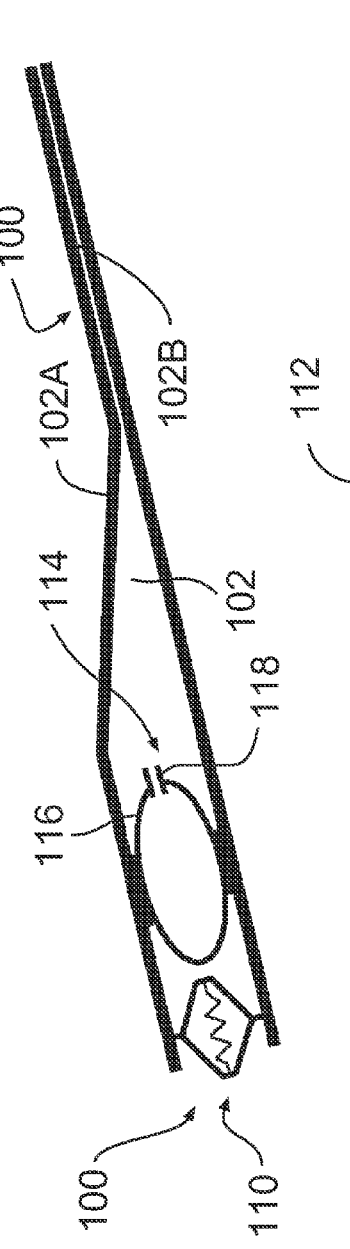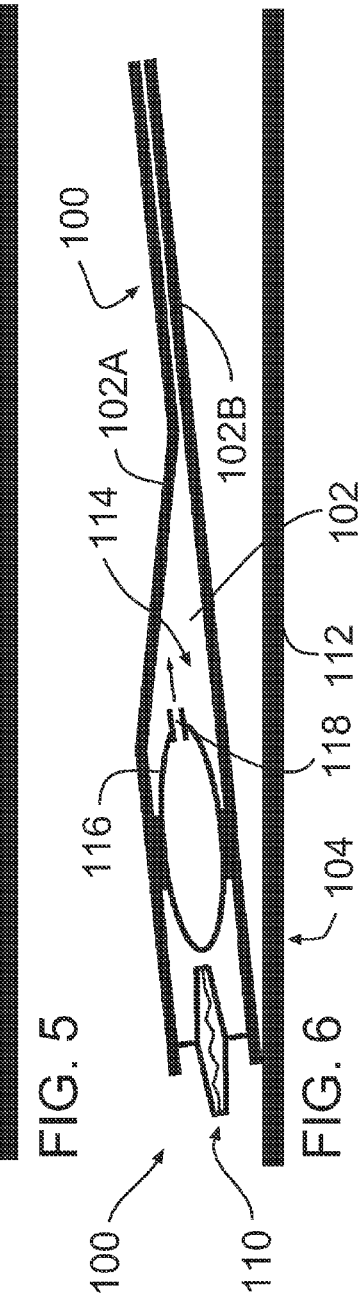

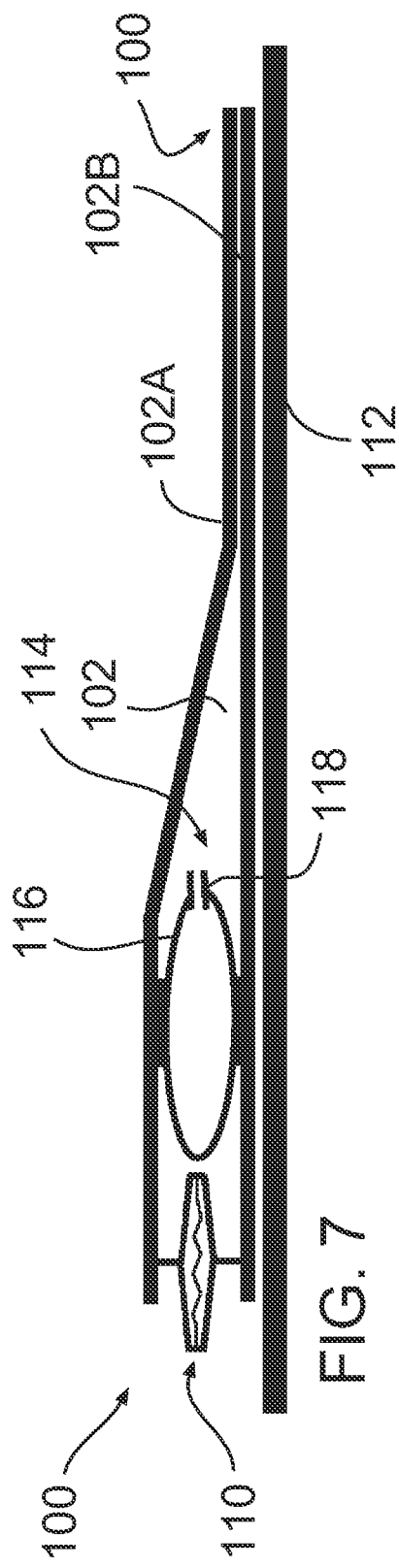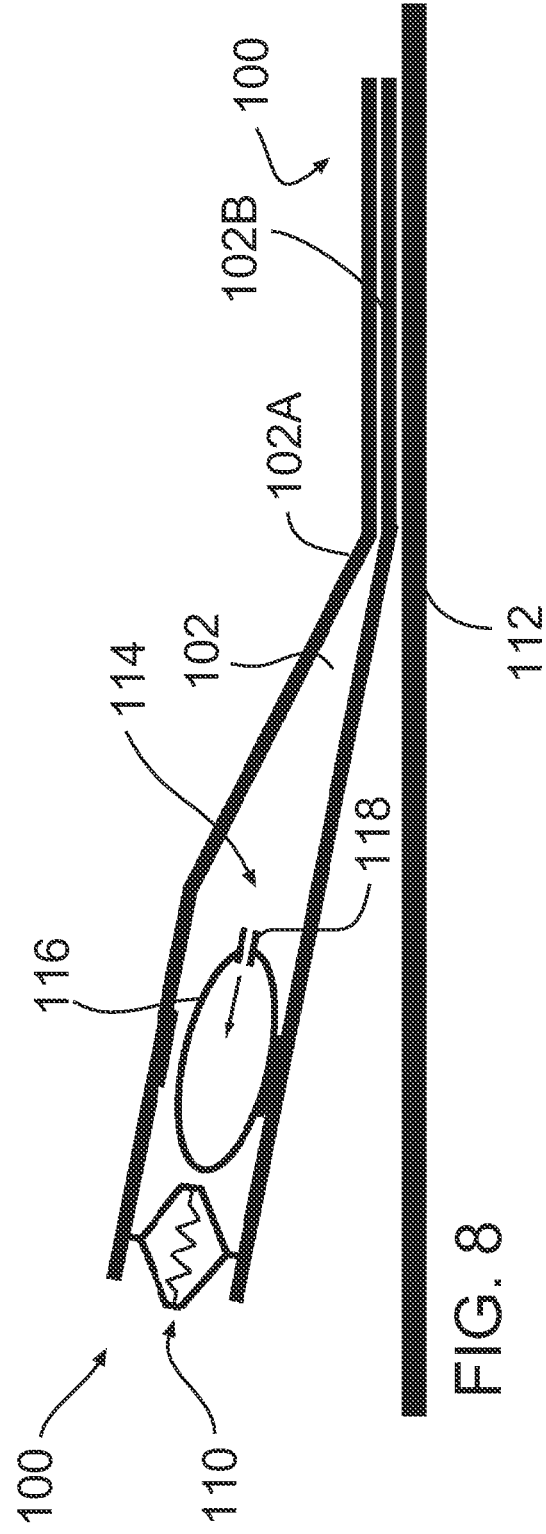

ENERGY STORAGE AND RETURN SPRING

CROSS-REFERENCE TO RELATED APPLICATIONS

This application claims the benefit under 35 USC 119(e) of provisional patent applications Nos. 60/970,263; 60/992,920; 61/016,555; 61/016,558 and 61/024,898 filed Sep. 6, 2007; Dec. 6, 2007; Dec. 24, 2007; Dec. 24, 2007; and Jan. 30, 2008 respectively.

BACKGROUND

Field: springs, in particular springs used in shoes. It is common in human footwear to have a sole material which compresses to absorb impact energy when the mass of the user is transferred to the shoe during each foot strike. Energy is stored in the compression of the sole and then released back as a vertical force on the bottom of the user's foot. The force required to compress the sole must be high enough to decelerate the mass of the user while walking and/or running. Due to the low travel of this "suspension system", the bounce frequency of a conventional spring will be higher than the natural frequency of the user's walking or running gait. This causes the energy to be returned at a higher frequency than is desirable. A conventional shoe-sole spring will return the stored energy too early in the foot stride. This does not apply a significant portion of the stored energy to the forward motion of the user. A large number of spring shoe designs are known such as in Illustrato U.S. Pat. No. 4,894,934; Chung U.S. Pat. No. 6,553,692; Illustrato U.S. Pat. No. 4,638,575; Vorderer U.S. Pat. No. 4,943,737; and Meschan U.S. Pat. No. 6,996,924 and it is proposed to provide an improvement over these designs of spring shoes.

SUMMARY

A spring shoe, and also in particular a spring, as well as a method of returning energy to a user, are provided. In one embodiment, a method and apparatus stores foot strike energy and releases the energy after a slight delay, when the energy will have a forward component. This is accomplished in an embodiment by a spring in the sole which has a decreasing spring force, such that the force required to compress the sole decreases for all or part of the compression displacement as the spring is compressed.

In this way, the force of the user's foot strike can be stored in the elastic deformation of the spring during compression of the sole. The more the sole is compressed past a point of maximum force, the more energy is stored, but the less force the sole exerts vertically on the heel of the user (or anywhere else such a spring or sole construction is used). When the user's weight starts to roll forward to the front of the foot during walking or running, however, the stored energy from the initial foot strike is released as the spring force increases during extension of the sole, propelling the user vertically and forward.

In another embodiment, the spring comprises at least two air chambers, a first chamber acting to provide resistance to compression and another storing gas ejected from the first chamber and then returning the gas to the first chamber after a delay.

The function of the spring is comparable to a compound bow (such as a hunting bow) which takes a large force to draw back, but then requires very little force to hold it in that position. When the string is released, however, the energy which went into elastically deforming the bow is released into the arrow to propel it.

In a similar way, the energy storage and return spring allows the shoe sole to store a large amount of compression energy from a foot strike without exerting a large force when in the fully compressed position. This gives the center of gravity of the user time to move forward (or nearly forward) of the heel and/or ankle before the spring releases the stored energy, providing an upward force on the heel which includes a forward component on the center of gravity of the user.

In one embodiment of an energy storage and return spring, which uses an arched rigid element and an elastic element, the spring may be used in other applications where energy storage and return is desired.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1 is a schematic showing an exemplary spring shoe with spring at no compression and damper extended prior to foot strike;

FIG. 2 is a schematic showing an exemplary spring shoe with spring compressed and damper compressed at foot strike;

FIG. 3 is a schematic showing an exemplary spring shoe with damper at full compression in the energy storage position with the weight of the person on the sole;

FIG. 4 is a schematic showing an exemplary spring shoe with damper trailing spring expansion after foot lift;

FIG. 5 is a schematic showing an exemplary spring shoe with spring at no compression and air damper extended prior to foot strike;

FIG. 6 is a schematic showing an exemplary spring shoe with spring compressed and air damper compressed at foot strike;

FIG. 7 is a schematic showing an exemplary spring shoe with air damper at full compression in the energy storage position with the weight of the person on the sole;

FIG. 8 is a schematic showing an exemplary spring shoe with air damper trailing spring expansion after foot lift;

FIG. 18 is a side perspective, FIG. 19 is a side view, FIG. 20 is a cross-section and FIG. 21 showing the conical disk flattened;

DETAILED DESCRIPTION

Figure 9:
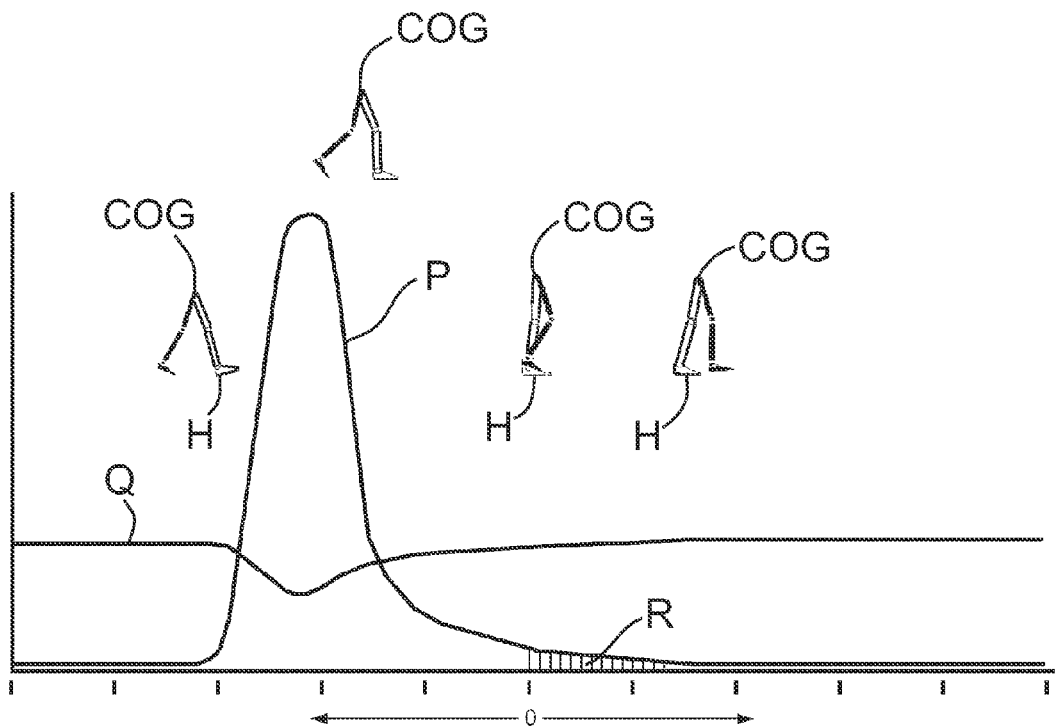
FIG. 9 is a graph for a conventional shoe showing: line P, upward vertical force exerted on the user in relation to angle of center of gravity to heel, with zero at the center, negative angle with no forward component of vertical force to the left, positive angle with forward component to the right, and line Q, degree of compression of the sole related to angle of center of gravity to heel.

Referring to FIG. 1, an exemplary spring shoe 100 is shown in schematic form. The spring shoe 100 has a sole 102, shown here schematically as being bounded by upper surface 102A, which may be an insole, and lower surface 102B, which is the outsole. Between surfaces 102A and 102B is the midsole. The sole 102 has a heel 104 and forefoot 106. An upper 108 is secured to the sole 102. The shoe 100 may be any human footwear, including (but not limited to) a sandal, running shoe, orthopedic shoe, sport shoe of any kind including skates, skateboard shoes, and ski boots, walking shoe or boot, hiking shoe or boot, dress shoe, boot, high heel shoe, thong or flip-flop, slipper, loafer, clog and work boot. The upper 108 conventionally includes at least means to secure a human foot to the sole 102 which can be of any type such as a flexible strap or straps, strap with buckle or other fastener, lace or elastic sleeve.

A spring 110 is set in the sole 102. The spring 110 is shown schematically in FIG. 1 and need not have the precise structure shown. The structure shown is intended to show one embodiment of a spring having the desired characteristics. More than one spring 110 may be used in a shoe. The spring 110 may be a compound spring, and may include components of the sole. The spring 110 may be secured in the sole 102 by any suitable manner.

The shoe 100 of FIG. 1 is shown above a ground surface 112, with the spring 110 being at zero compression and separating insole 102A from outsole 102B by distance A. In FIG. 2, the spring shoe 100 is shown after contact with the ground 112 and the spring 110 has been fully compressed so that the insole 102A is separated from outsole 102B by distance B. The spring range of travel between endpoints corresponding to full compression and no compression is therefore equal to A-B. The spring 110 has a spring rate that varies with the compression of the sole 102 to provide a reducing force resisting compression over at least a portion of the spring range of travel as the sole 102 compresses. It will be appreciated that the reference to a spring rate means the coefficient that relates the force applied by the spring 110 to displacement of the spring 110. The spring rate of many springs is constant, but in this case varies. The provision of a portion of the spring range of travel with reducing force as the sole 102 compresses allows energy to be stored indefinitely while the spring shoe 100 is flat on the ground while bearing all or part of the weight of the user as shown in FIG. 3, and returned to the user as shown in FIG. 4 when all or part of the weight of the user is is no longer acting to compress the spring.

Thus, the exemplary spring shoe 100 is able to return a portion of the compression energy to the user after the user's center of gravity is forward of the user's heel (when the user is walking forward). The spring 110 may be formed of a rigid member and an extensible member that is stretched when the rigid member moves under compression from a foot. In some embodiments of the spring 110, the direction of the primary force which is stretching the extensible member becomes more aligned with the direction of extension of the extensible member for all or part of the compression displacement of the assembly (or shoe sole) as the assembly (or shoe sole) is compressed. In some embodiments of the spring 110, the mechanical advantage of a rigid member as it stretches an extensible member, or compresses a compression member, increases for all or part of the assembly or shoe sole compression displacement as the assembly or shoe sole is compressed.

The spring 110 when compressed by a force, such as the weight (and inertia) applied by a user to the spring 110, will have an oscillating frequency that depends in part on the applied force. If the applied force is less than the force required to compress the spring 110 to the point at which the spring rate of the spring is zero, the spring 110 will have a more conventional oscillating frequency. However, when the applied weight is sufficient to compress the spring 110 into the region where the force reduces, then the spring will not oscillate until the force which is compressing the sole is reduced sufficiently that the spring leaves this region.

Due to the reduction of spring force as the sole 102 compresses, it is desirable to use two different components, the spring 110 to provide energy storage and a damper 114 to provide energy dissipation. The spring 110, which is an energy storage and return device, may be made of a variety of components including more than one spring element. The spring 110 exhibits a reducing spring force for all or part of its compression displacement and is placed in the shoe sole 102 under the heel of the foot. In some embodiments, one or more springs 110 may be placed in the forefoot 106. During compression, the spring 110 exerts a greater vertical force part way through its compression than it does at or near full compression. At the maximum force position (preferably approximately ⅔rds of the way through the compression displacement or range of travel, but other points in the compression will also work) it is preferable that the spring 110 exerts a vertical force of between 50% and 80% of the total weight of the user. At the maximum force position, the spring constant is zero. When fully compressed, the maximum force of this component is preferably between 20% and 40% of the user's weight. These percentages do not need to be precise for good performance, and it has been found by testing that one spring provides good performance for a wide range of user weights. These are the preferred forces for maximum energy return for a walking shoe. Higher percentages are preferred for a running specific shoe, and lower percentages are preferred for a lower performance shoe that is intended to provide less energy return function such as in a less expensive shoe. There may also be certain applications where the maximum compression force is preferably higher than 60% and the full compression force is lower than 30%. There may also be applications where the maximum compression force is preferably lower than 60% and the full compression force is higher than 30%.

The preferred percentages of user body weight in the previous paragraph are the preferred percentages for a walking shoe. Different variations of the maximum and full compression forces are possible in a device that provides a spring force which increases for the first portion of the compression displacement and then decreases for the next portion of the compression. The spring 110 may also (by itself or in combination with one or more members) provide an increasing spring force again at full compression. This would happen over a relatively short compression displacement and would act as a "bottom out bumper" to prevent unwanted impact at full compression.

Several examples of construction methods for the spring 110 are described. The spring 110, if used only by itself, would compress past the maximum force position with approximately 60% the weight of the user, such as with slightly more weight than when the user is standing with all of his or her weight distributed equally on both heels. The spring 110 may fully compress with a greater or lesser proportion of the user's weight, but it is the belief of the inventors that approximately 60% of the weight of the user is the ideal spring force of this component at the maximum compression position for a walking shoe. The force of the spring 110 at full compression (preferably with a range of travel in the range of 5 mm to 20 mm, but more or less compression travel can also be used in some embodiments) is preferably approximately 30% of the weight of the user.

The purpose of the spring 110 is to allow full or nearly full compression of the shoe sole 102 during the foot strike (initial contact of foot to the ground) phase of each step, and for the spring 110 to stay compressed until the user's center of gravity is forward or nearly forward of the user's heel and/or ankle position before the heel starts to unweight and lift. As the user begins to unweight the heel (FIG. 4), the force which is needed to keep the spring compressed at the full compression position is no longer provided and a portion of the energy stored in the spring 110 is returned to the user as it expands vertically back to its original shape. Due to the user's center of gravity being forward of the user's heel and/or ankle at this time, the vertical force which is applied to the user's heel results in a force with a forward component, thus propelling the user forward.

In some embodiments, a damper 114 is used which functions as an energy dissipation material and may be made of one or more components. The damper 114 is also placed in the heel 104 of the shoe sole 102 under the heel of the foot (and in some embodiments may be placed under the forefoot instead or as well). The damper 114 is designed to provide resistance to compression of the shoe sole 102 for the portion of the user's mass and inertia which is not effectively opposed by the energy storage and return spring 110. The damper 114 is biased so that it acts only or primarily during the compression phase of the shoe sole compression and rebound. During the rebound phase, the combination of the spring 110 and damper 114 allows the damper 114 to return to its original shape more slowly, quickly enough so it is available to dissipate energy during the next foot strike, but not as quickly as the spring 110 expands when the user heel begins to lift. This can be accomplished, for example with Sorbothane™ material manufactured by Sorbothane Incorporated, of Kent, Ohio, USA by permanently connecting a compression member of Sorbothane™ material to the shoe sole 102 (or spring) only at the top or the bottom of the Sorbothane™ component. The other end of the damper 114 is in contact with the shoe sole 102 during all or part of the compression phase, but it is allowed to not contact during the expansion phase of the sole 102 so it does not detract from the energy which is being returned to the user by the spring 110.

In this way, the foot strike phase will cause the spring 110 as well as the damper 114 to compress with a similar increase of force as a conventional linear or increasing rate spring which is capable of decelerating the entire mass of the user without bottoming out harshly. A conventional rate spring would return much of this compression energy (by expanding again) before the user's center of gravity is forward of the user's heel. With shoe 100, however, the damper 114 does not add to the rebound energy (or frequency) because it only significantly acts to slow the compression. The effect is to store a significant portion of the foot strike energy in the spring 110, and to provide a suitable rate of deceleration with the damper 114, and then to return energy which is stored in the spring 110 to the user once the user's center of gravity is forward or nearly forward of the user's heel. In other words, the effect of the combination of these materials to the user is the feeling of the two components (the spring 110 and the damper 114) working together to provide enough compression force and/or resistance to gradually decelerate the mass of the user during the foot strike phase of each step. When the user's center of gravity has moved forward or nearly forward of the user's heel and the user begins to unweight their heel as shown in FIG. 4, energy stored in the spring 110 is returned as an upward force on the heel which contributes to the forward motion of the user. The damper 114 is not in contact (or not significantly resisting expansion of the shoe sole) for all or part of the expansion of the sole and does not significantly inhibit the expansion of the spring 110. If the damper 114 is a solid member such as a component made of Sorbothane™ material (or other energy dissipating material or material configuration), it will preferably expand more slowly than the spring 110 but quickly enough to return to a shape (or displacement) to allow this component/s to dissipate energy on the next foot strike.

Another embodiment of the damper 114 which would provide a high degree of energy dissipation is shown in FIGS. 5-8. The embodiment of FIGS. 5-8 uses a flexible, but preferably not extensible, material air diaphragm 116 with a valve arrangement 118 which forces air through a restricted orifice during compression and allows this air back into the diaphragm through a one-way less restricted valve which opens to allow reinflation. A more simple version of the valve arrangement 118 uses only a two-way restricted orifice which is small enough to provide adequate energy dissipation during deflation of the diaphragm during compression, and large enough to allow the air diaphragm to re-inflate between foot strikes.

In this configuration of FIGS. 5-8, the air diaphragm 116 must be allowed to lose contact during expansion, as shown in FIG. 8, or to maintain contact but deform in such a way that it does not significantly resist expansion of the spring 110.

Figure 58:
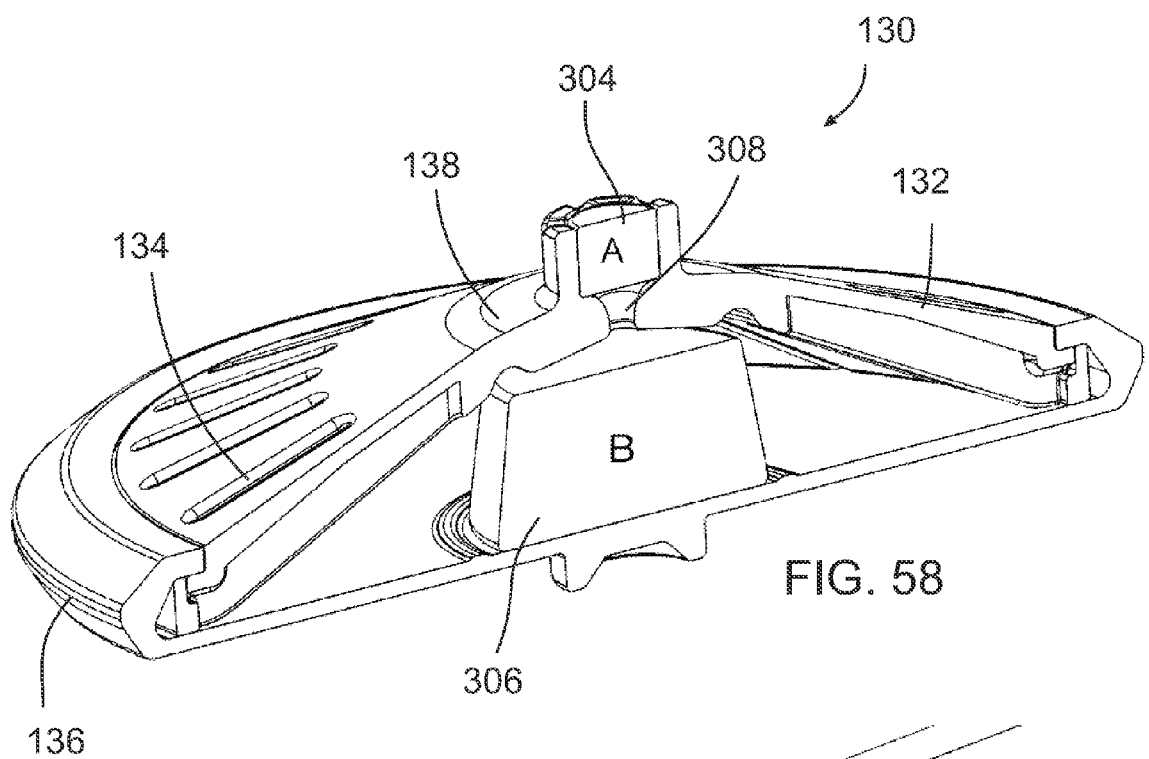
FIG. 58 shows a perspective cutaway view of a conical disk spring in which the interior of the disk comprises an air chamber as part of a damping system and there is a valve in the center of the disk.

FIG. 58 shows an orifice 308 in the top of the conical disk and a porous restriction element 304 that primarily acts as a sounds suppression member. The orifice is sufficiently large to allow re-inflation of a sealed air chamber inside the conical disk with minimal restriction. It is also small enough to prevent extrusion of a compressible foam member 306 through the orifice during compression. Alternatively, the orifice opening could be larger and filled with a non-compressible porous material that would prevent extrusion of the compressible foam material. The embodiment show also has an (unlabeled) boss on the center of the outside of the bottom sealing element, intended to position the bottom of the disk.

During compression, restriction is preferably provided primarily by the compressible foam member 306 which is adhered to the bottom of the air chamber. This member is preferably open celled foam but can be closed cell for example if it has an air permeable top surface (an open-celled foam with an air permeable top surface can also be used and may even pre preferable for long term function). As the foam compresses, it becomes more dense and the resistance to airflow increases. If it is a closed cell foam, the top surface contact pressure against the orifice region increases with compression and the air permeable top layer increases the air flow resistance. Either way, the air flow resistance increases as the disk compresses, providing a progressively increasing damping effect with compression.

The compressible foam 306 is preferably an open-cell structure with a visco-elastic property which causes the foam to stay compressed momentarily as the disk expands. This allows the air flow restriction to be minimized during expansion of the spring, biasing the damping to compression only. The foam preferably expands quickly enough to be back to near its original shape before the next foot-strike.

The orifice 308 can also be in the bottom seal member (top and bottom as used throughout this disclosure in relation to the spring itself being for discussion sake only—the disk could be used inverted in a shoe) with the foam being adhered to the conical disk instead. The memory foam can be in contact with orifice initially or not (as shown in FIG. 58). The insole of shoe must be designed to allow airflow to and from disk. This airflow may have the additional benefit of ventilating the shoe.

Figure 60:
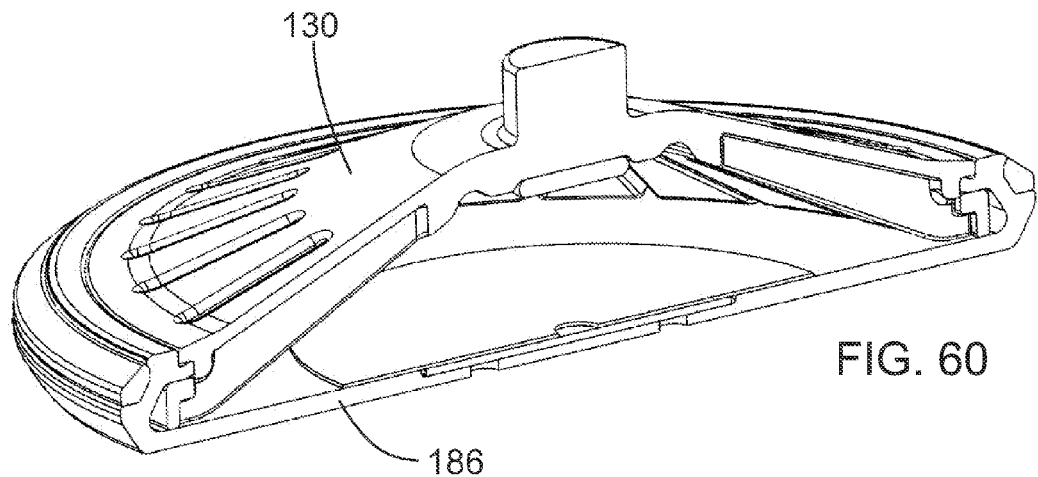
FIGS. 60 and 61 show respectively a perspective cutaway view and a close-up perspective cutaway view of a conical disk in which the interior of the disk comprises an air chamber in which a diaphragm compresses a resistor material to provide a variable damping rate.
Figure 61:
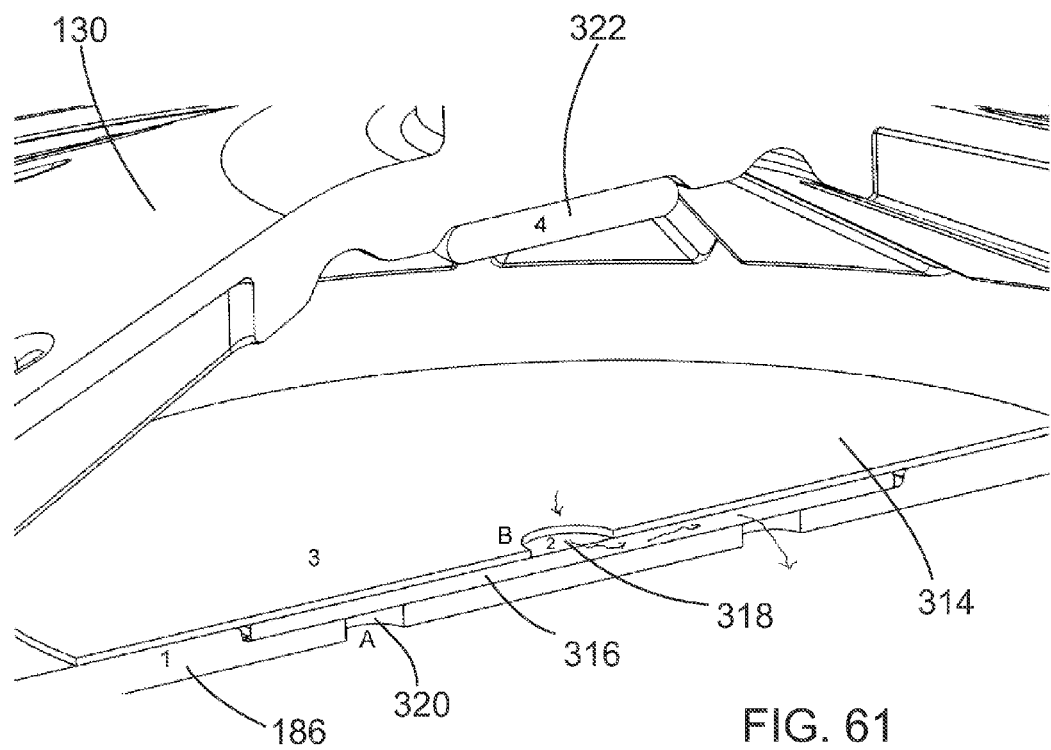

Another design for the biased air damper, as shown in FIGS. 60-61, is to have a resistor material 316 sandwiched between a diaphragm 314 and a bottom seal member 186 to act as flow regulator elements so that when the pressure in the air chamber is high, it compresses the resistor material and restricts airflow out of the chamber through the resistor material. When the airflow is in the other direction, the airflow is less restricted as the resistor material is uncompressed, and depending on the embodiment, there may be a gap either between the resistor material and the bottom sealing member or between the resistor material and the diaphragm. The resistor material may be an open cell foam or may be felt or another material that allows air flow. The flexible diaphragm seal may be polyurethane but many other materials will work.

This configuration of a damper integrates a one-way seal and a pressure modulated air resistance as follows: As the disk compresses, the increasing air pressure, acting on the flexible diaphragm 314 compresses the resistor 316 to provide increased air damping during higher velocity compression as the air flows through the resistor material from diaphragm hole/s 318 to bottom seal hole/s 320. The air pressure also decreases as the compression slows down near full compression, as the user's mass is decelerated. This allows the resistor to uncompress and reduce the air flow resistance so the air can be exhausted at full compression without causing an air spring effect, in order to bring the user's mass to a complete downward stop with as little rebound as possible. As the disk rebounds, the flexible diaphragm 314 lifts and allows free flow of air back into the chamber. The resistor 316 may optionally have a hole, preferably concentric with the hole/s in the diaphragm 314, or with the hole/s in the bottom sealing member 186, to allow unrestricted air flow during spring extension.

A compressible secondary sealing/air-flow-resistance member 322 can be used to further increase air flow resistance, or even seal the chamber completely, at nearly full compression to reduce the impact of a full compression movement.

Figure 10:
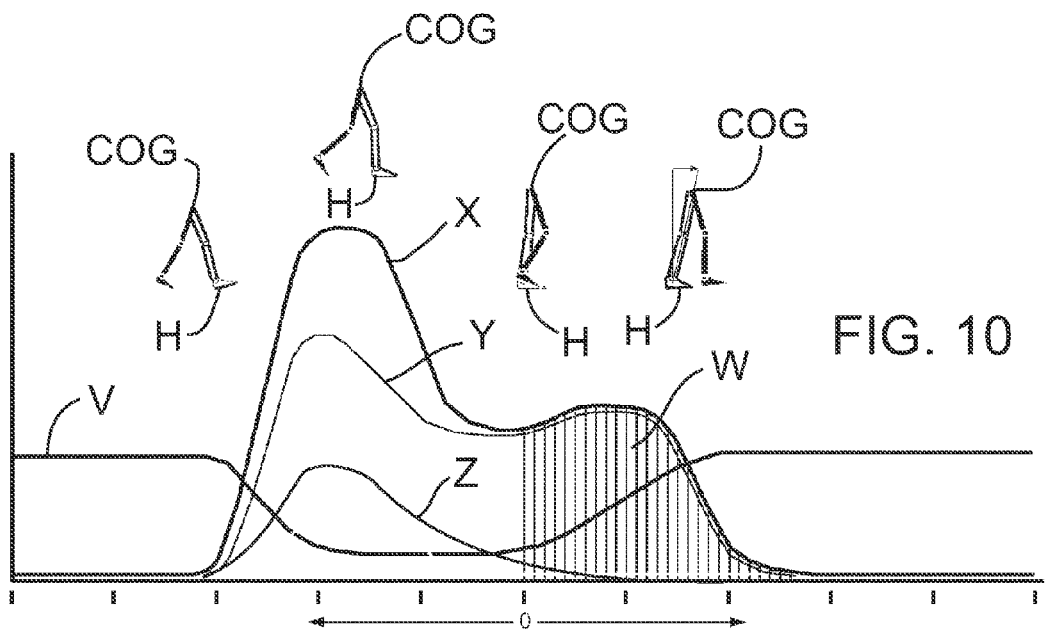
FIG. 10 is a graph for a shoe of FIGS. 1-8 showing: line X, upward vertical force exerted on the user in relation to angle of center of gravity to heel, with zero at the center, negative angle with no forward component of vertical force to the left, positive angle with forward component to the right, line V, degree of compression of the sole related to angle of center of gravity to heel, line Y, force exerted by the spring 110 related to angle of center of gravity to the heel, and line Z, the damping force related to angle of center of gravity to heel.
Figure 11:
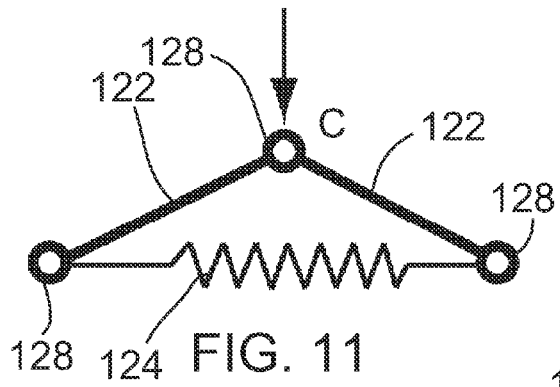
FIGS. 11-16 illustrate possible configurations of a shoe spring.
Figure 14:
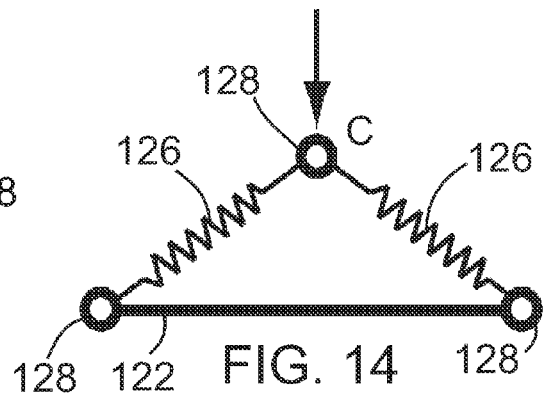
Figure 12:
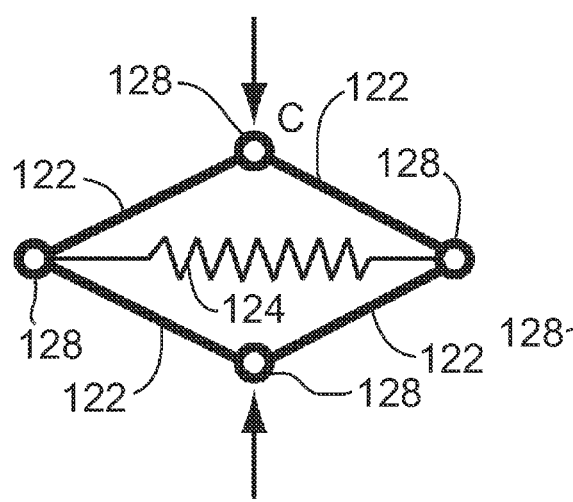
Figure 15:
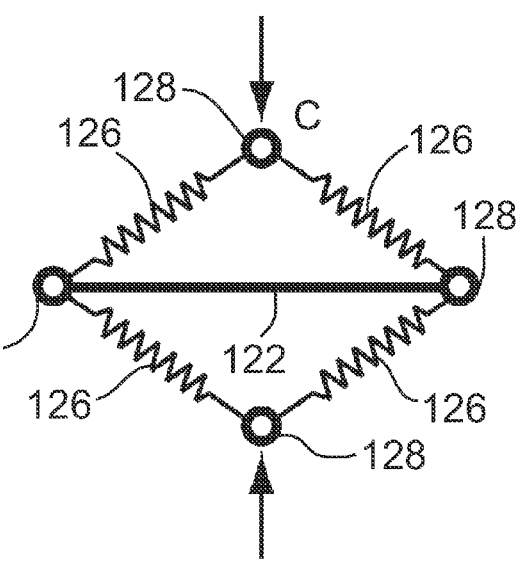
Figure 13:
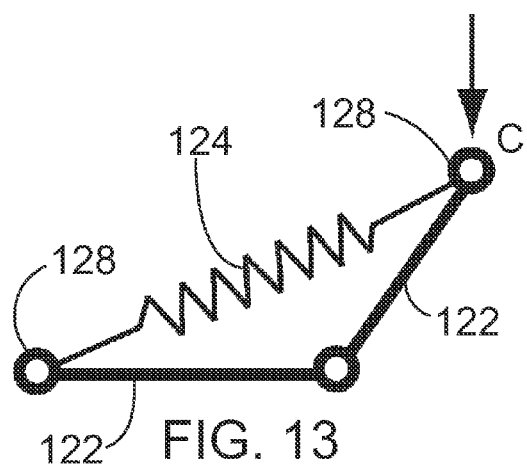
Figure 16:
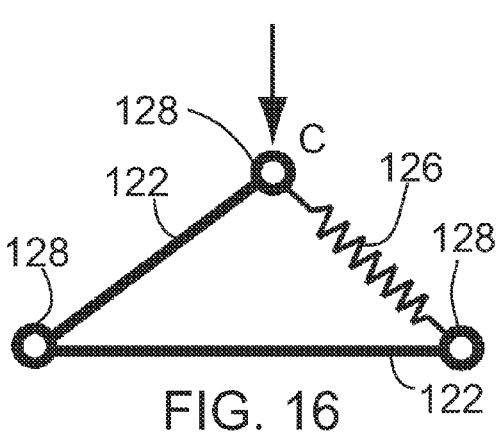
Figure 17:
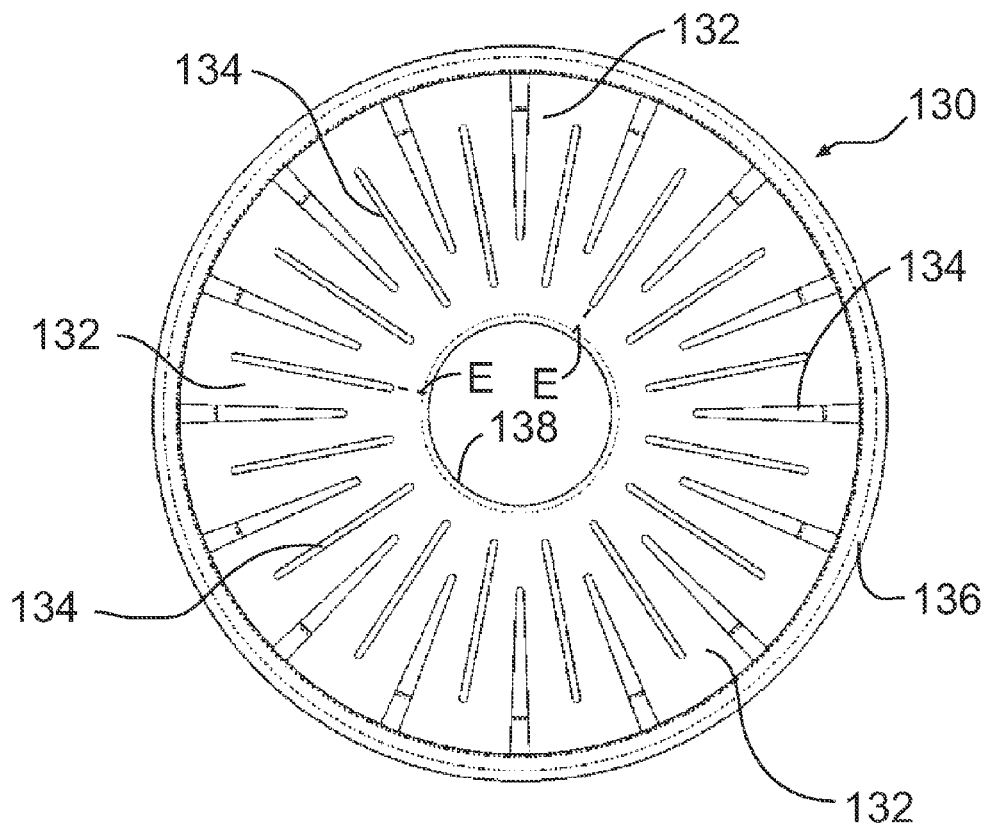
FIGS. 17-21 illustrate embodiments of a spring 110 using an arched element, in this case a conical disk, with FIG. 17 being a top view.
Figure 18:
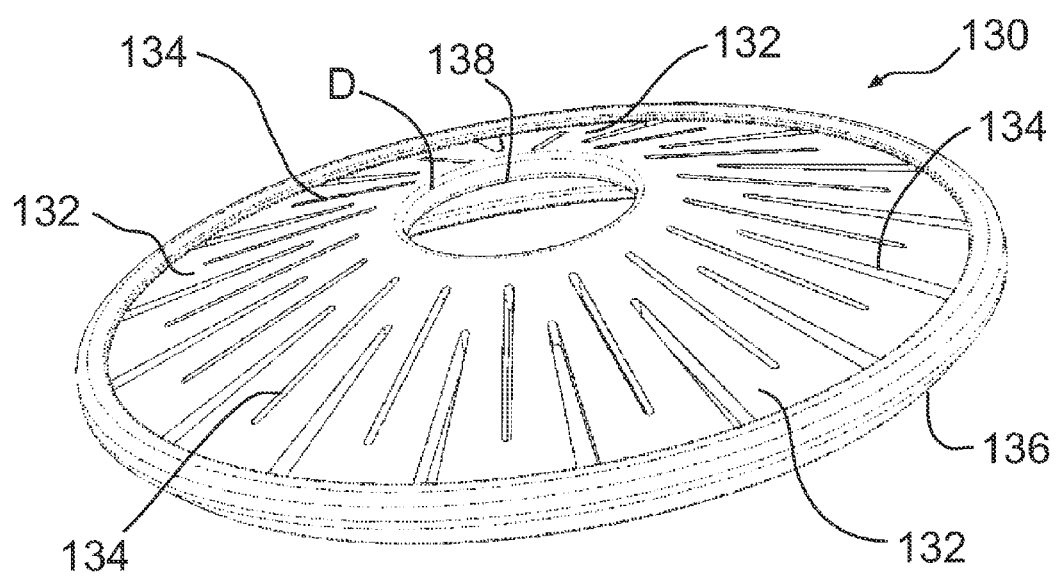
Figure 19:
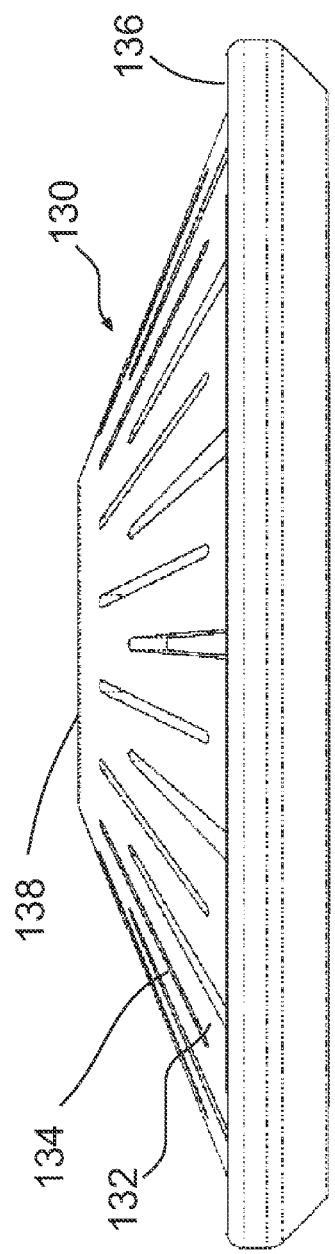
Figure 20:
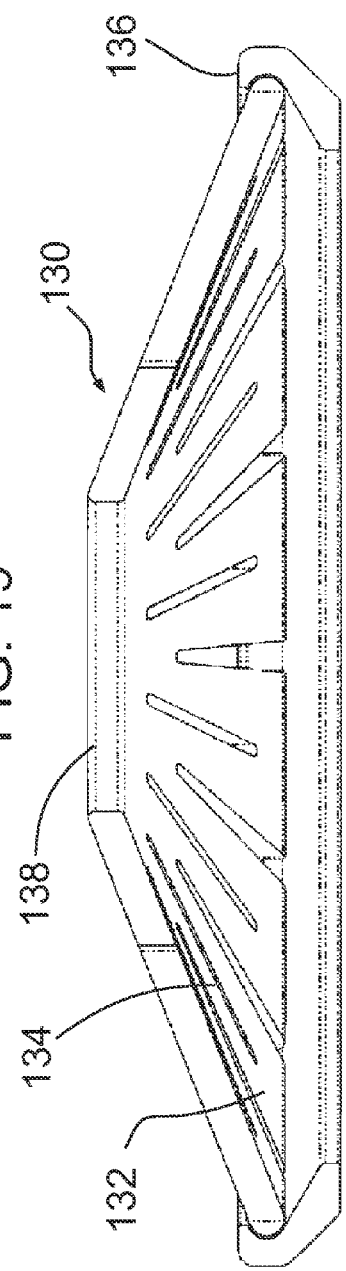
Figure 21:
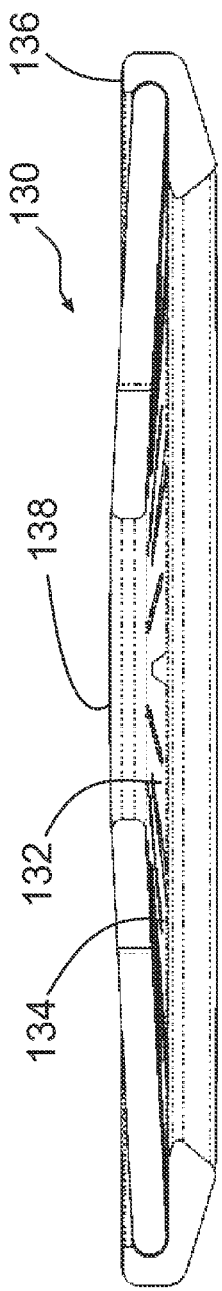

The graphs of FIGS. 9 and 10 illustrate the energy storage and dissipation of a conventional shoe sole compared to a shoe sole using the present invention. The stick figures show position of center of gravity COG in relation to the ankle position H. Each stick figure is located on the vertical line through the position on the x axis corresponding to the angle of center of gravity to the ankle at the foot stride position illustrated by the stick figure. The four stick figures correspond to the positions shown in FIGS. 1-4. The shaded area R of FIG. 9 shows the energy available for return to the user from a conventional shoe. The shaded area W of FIG. 10 shows the energy available for return to the user using a spring shoe 110. The shaded area W acts during the stride phase when the positive angle of center of gravity to ankle allows the vertical force provided by the spring 110 to provide a forward component of force to the user's COG.

FIGS. 11-16 illustrate embodiments of a spring 110 using rigid members 122 and elastic spring elements 124, 126. The elastic spring elements 124 resist flattening of the rigid members 122 by tensile forces of the elements 124. The elastic spring elements 126 resist flattening of the rigid members 122 by compression of the elements 126. In each case, the rigid elements 122 flatten under pressure applied to the apex C of the springs 110. As the rigid elements 122 flatten, they exert an increasingly higher mechanical advantage over the elements 124, 126 and the spring constants of the springs 110 decline to zero and then become negative as the spring force exerted by the springs 110 reaches a maximum value and then decreases. The respective rigid members 122, spring elements 124 and spring elements 126 are connected by hinges or pivots 128. The rigid members 122 are sufficiently rigid to expand the spring/s without deforming to the point of buckling or breaking. Friction of the hinged elements will contribute to the damping effect. If the hinges are live hinges, any inherent spring rate of the hinges will contribute to the overall spring rate of the spring. The hinged elements are sufficiently flexible to prevent spring forces of the hinged elements from negating the energy storage and return function of the springs 110. For clarity, the hinges must pivot or flex with less resistance than the decrease of force provided for by the entire spring assembly. Otherwise the combined assembly will not provide a decreasing spring force.

FIGS. 17-21 illustrate embodiments of a spring 110 using an arched element, in this case a conical disk 130. The conical disk operates in accordance with the design of FIG. 11. Arched in this context means raised in the center. The sides 132 of the conical disk 130 are sufficiently rigid to not buckle or mechanically fail when they are in compressive loading during spring compression, and have expansion slots 134 that in this embodiment are oriented radially. The slots 134 may be blind (do not extend through the disk) or may extend through the disk 130. The periphery of the conical disk 130 is connected to an elastic element 136 that resists flattening of the conical disk 130 due to force on the apex D of the conical disk 130. The conical disk 130 and the periphery ring 136 form an embodiment of the spring 110 with an increasing-decreasing spring force. In other words, the conical disk 130 and ring 136 exert a greater force part way through the compression than at or near full compression. The force exerted in expansion may not necessarily follow the same curve; it may for example be approximately constant as it expands to a certain point and then decrease, or even decrease throughout the expansion. If the disk 130 comprises a first material having a first flexibility, then the expansion slots 134 may be considered to comprise comprise regions of a second material having a second flexibility greater than the first flexibility (as for example the second material could be a elastomer or a fluid or air). The elastic element 136 also forms a base for the disk 130.

The conical disk 130 and ring 136 is a preferred embodiment of an energy storage and return component. Many other configurations are possible. The slots 134 allow the conical disk 130 to expand circumferentially with little stress on the material of the conical disk 130. When not assembled with the outer ring 136, the conical disk 130 may be compressed into a flat shape with significantly less force than when it is assembled to the ring 136. The conical disk 130 may be made of polypropylene or other negative Poisson's ratio material or other suitable materials such as metals or plastics. If the conical disk 130 is made of a metallic material or a rigid plastic, that is, excluding polypropylene or other negative Poisson's ratio materials, there may need to be continuations E of the slots to the interior edge 138 of the conical disk 130 to allow the disk 130 to flatten without damage to the material of the disk 130. The interior edge 138 of the conical disk 130 forms a circular hinge about which the sides 132 of the conical disk 130 flex. A negative Poisson's ratio material such as, but not limited to, polypropylene may be used without the slots extending to the center because it can act like a live hinge in high strain areas. In some embodiments, slots extending to the center may be contacting, such as with intentional crack lines or ball and socket pivots to prevent the inner ring from closing in/decreasing in radius during compression of the spring.

When the conical disk 130 is flattened due to a vertical compressive force exerted on the apex D, energy is stored in the outer ring 136 as the ring 136 stretches radially and circumferentially. As the conical disk 130 flattens, the mechanical advantage of the disk on the outer ring increases significantly, and the vertical force of the conical disk 130 reaches a position where it begins to decrease. The outer ring may be made of plastic, such as polycarbonate or a material such as Delrin™ high performance acetal resin copolymer or homopolymer by Dupont, which have a high elongation property and good fatigue life.

An example of the conical disk 130 may be constructed for a 100 kg person with the following dimensions, materials and spring rate: Vertical displacement to maximum force—7 mm Maximum force at this position—60 kg Total maximum vertical displacement—10 mm Force at this position—30 kg Outer diameter of assembly—75 mm. The conical disk 130 may include a damper 114 (not shown in FIGS. 17-21) but may be a self inflating air diaphragm 116 with a restricted flow orifice according to FIGS. 5-8 for compression damping and a high flow one-way valve to allow it to refill with less air flow restriction. This air diaphragm 116 may be, for example, inside the conical disk assembly, or a toroidal shape around the outside of the conical disk assembly, or may be an air chamber that envelops the disk, or preferably as in FIGS. 32-36, an air chamber integrated into the construction of the spring 110 itself. These exemplary figures are configured to maximize the energy return for a walking shoe. Higher forces may be used for a running shoe where the compression forces are higher. Lower forces may be used for a lower performance shoe, where the spring 110 includes other shoe sole components such as a foam spring/s (such as the disk being encased in or surrounded by conventional shoe foam or combined with an air spring) so the spring 110 returns a lower percentage of the foot strike compression force.

Figure 56:
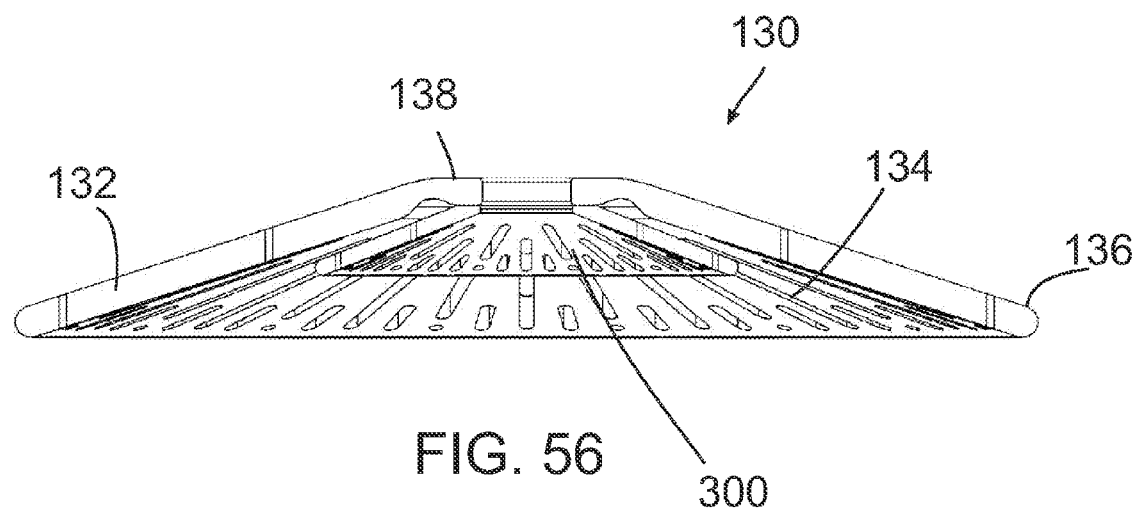
FIG. 56 and FIG. 57 each show a side cutaway view of a conical disk spring with another disk inside acting as a damper, with the damping disk attached to the main disk in FIG. 56 and attached to the lower sole in FIG. 57.
Figure 57:
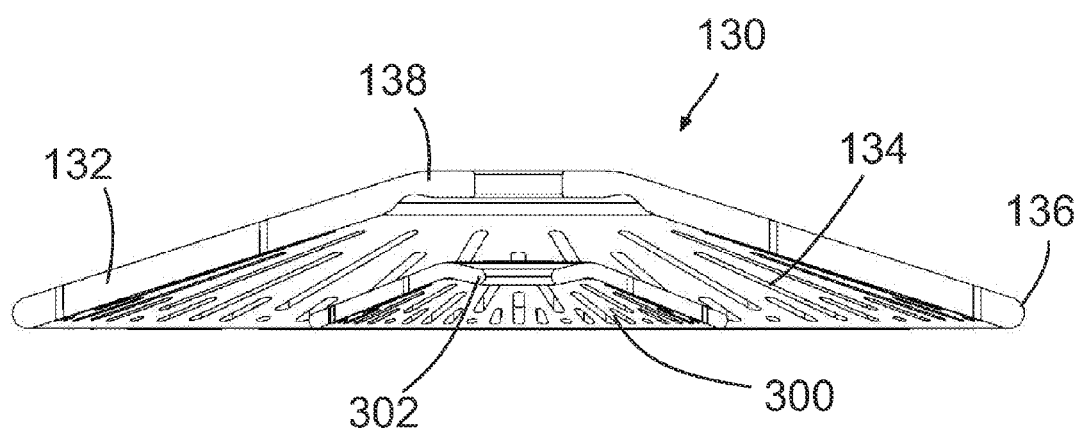

In another embodiment, one or more additional disks can be used to provide the damping force. The second disk can be secured to the main disk as shown in FIG. 56 or secured to the base as shown schematically in FIG. 57. The damping disk 300 is preferably made of a material such as Polyurethane that has a high visco-elastic property. This will allow the damping disk to exert a greater force on compression than on expansion. Ideally, the second disk begins to compress at a point in the travel where the primary disk force begins to reduce. This allows an increasing spring force for a greater distance through the travel. The primary disk can be of any design covered in the patent description. The damping disk may also be of any design in the patent description, the main feature being that it is preferably (but not necessarily) a more visco-elastic material than the primary disk and that it has less travel and begins to compress when the primary disk is part way through its travel. The inward/downward projecting flange 302 on the damping disk in FIG. 57 in some embodiments is optional and can act as a full stop bumper.

Other benefits of the conical disk 130 include the lateral stability which can be achieved. Even though the conical disk 130 allows high travel, it allows the shoe sole 102 to compress in a well defined vertical motion. For this to be effective, the top and bottom of the conical disk 130 need to be secured to upper surface 102A and lower surface 102B to prevent lateral movement. The disk 130 may also be adjusted forward and backward and side to side (such as, for example, with an eccentric cam) to compensate for pronation or supination, or to adjust the for and aft position of the disk under the heel.

Many different configurations, material combinations and geometries of the conical disk are possible.

There may be a flexible seal around the disk compartment between the upper and lower sole to keep the disk protected from dirt etc. This may be formed for example of a very light foam that completely encases the disk, or a flexible film or bladder made of a flexible solid material or foam material. This seal material will ideally not add significantly to the spring rate of the shoe sole.

Figure 22:
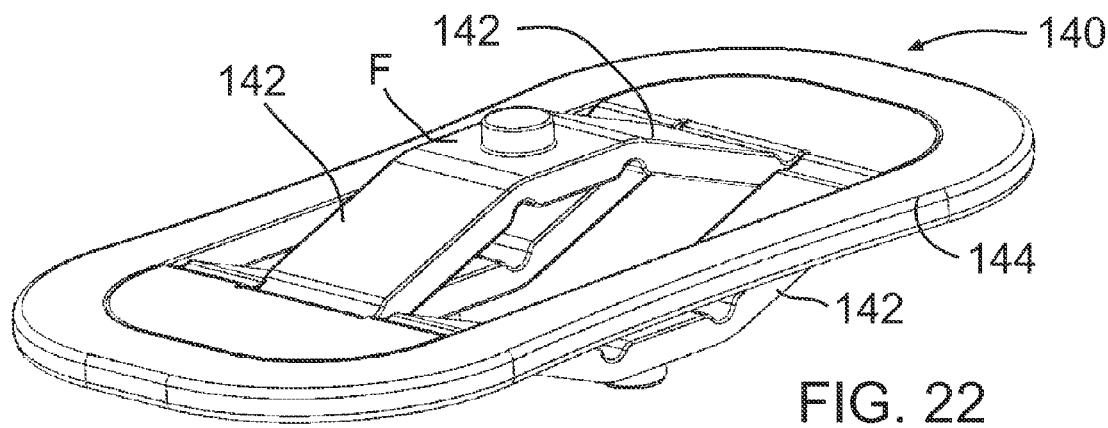
FIGS. 22-28 show first and second embodiments of non-conical hinged energy storage and return devices, FIGS. 22-24 being respectively perspective, side and top views, and FIGS. 25-28 being respectively top, side, end and perspective views.
Figure 23:
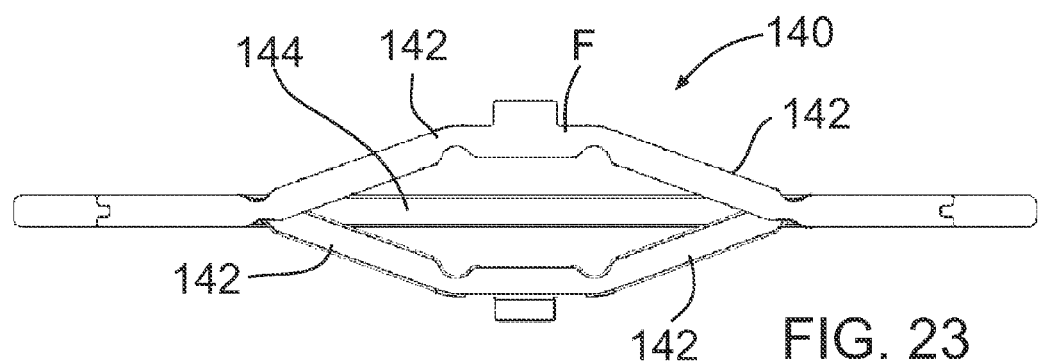
Figure 24:
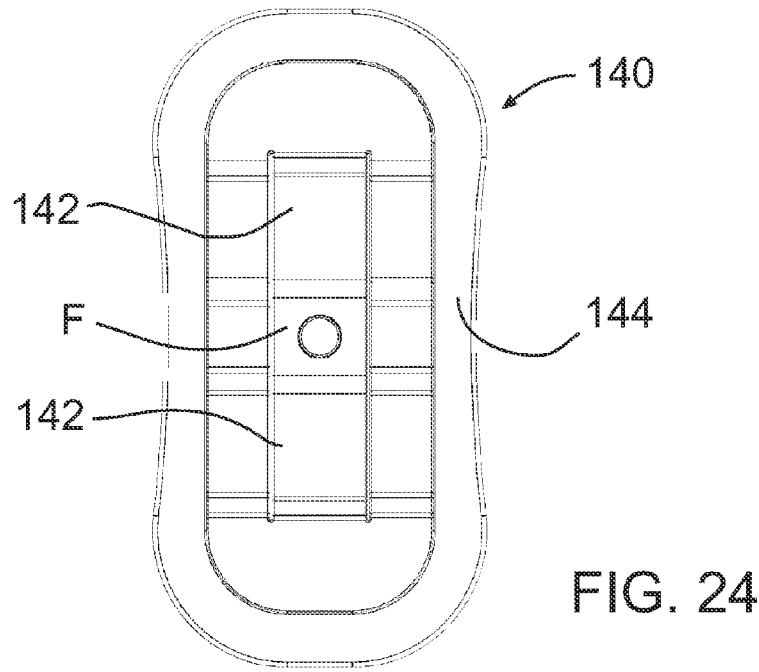
Figure 25:
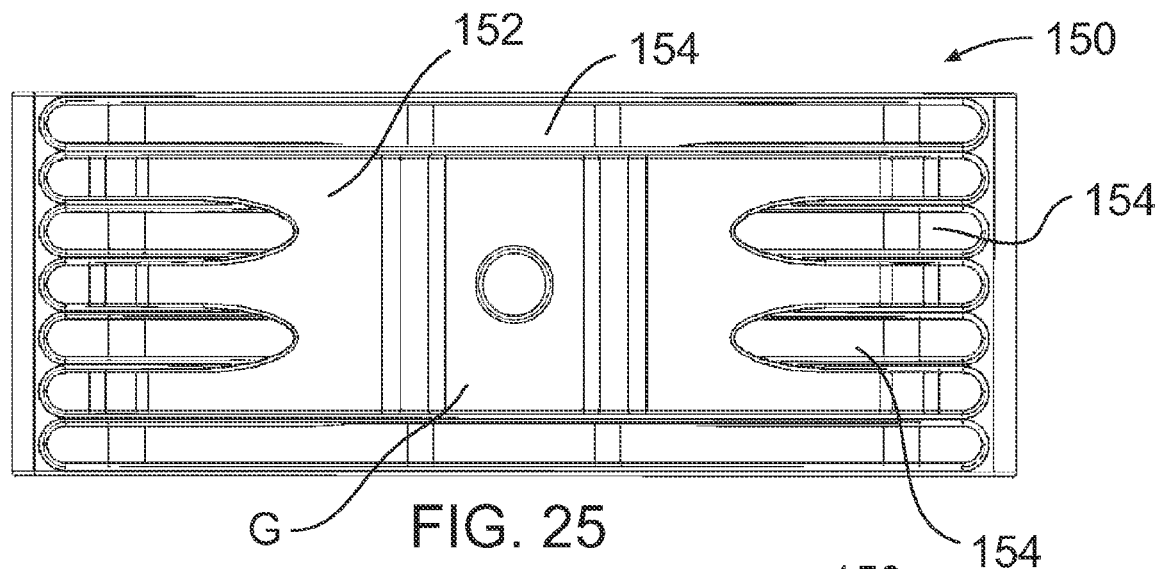
Figure 26:
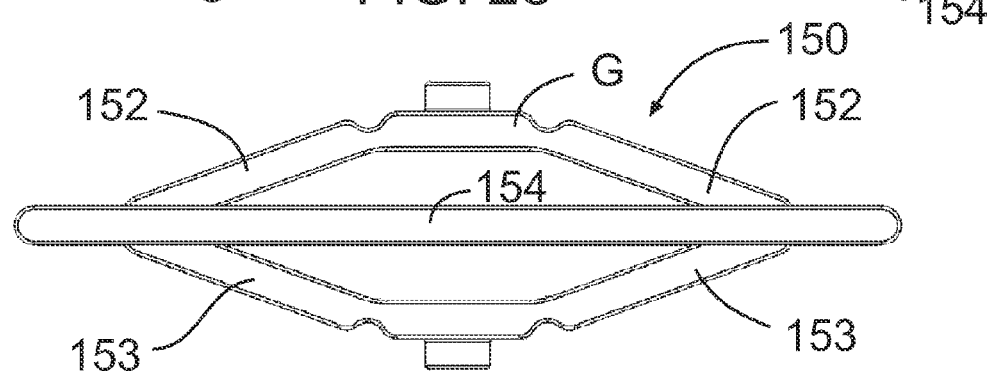
Figure 27:
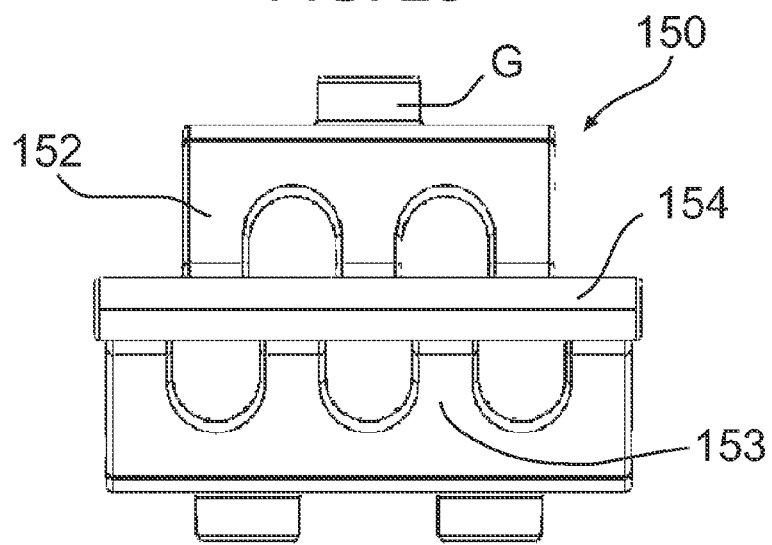
Figure 28:
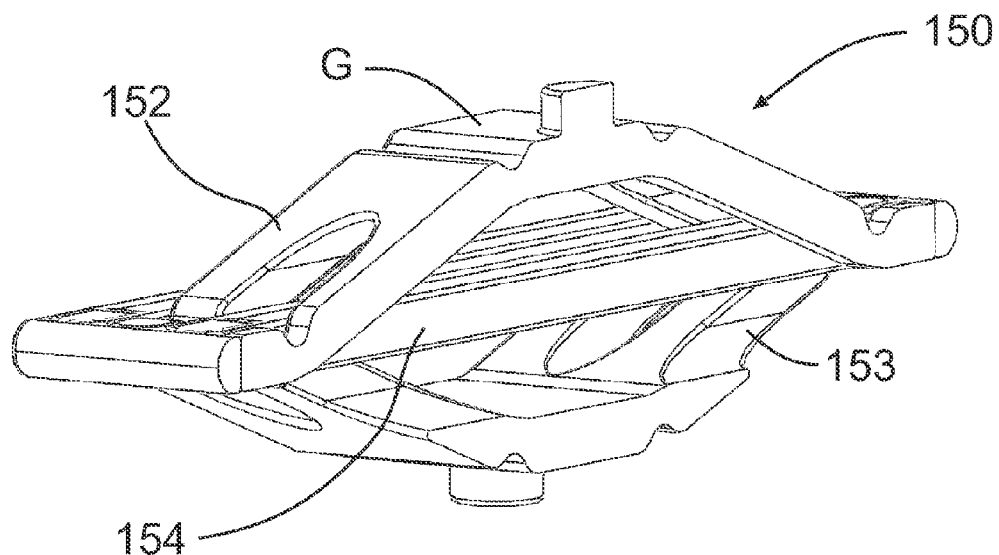

FIGS. 22-24 show an arched non-conical hinged spring 140 as an example of a spring 110. This embodiment uses one or more top hinged rigid members 142 and/or one or more bottom hinged members 143 to stretch an elastic element 144 preferably for example Delrin™ acetal resin (but many other materials may also be used). The elastic element 144 may be located around the outside of the assembly as in FIGS. 22-24. A hinge may be a composite hinge as in FIG. 22 and comprise one or more hinges.

FIGS. 25-28 show an arched non-conical hinged spring 150 as an example of a spring 110 with interior elastic elements. This embodiment uses one or more top hinged rigid members 152 and/or one or more bottom hinged members 153 to stretch one or more elastic elements 154 preferably for example Delrin™ acetal resin (but many other materials may also be used). The elastic elements 154 are located partly outside and inside. The rigid sides 142, 152 of FIGS. 22-28 are hinged to apex members F, G to allow the rigid sides 142, 152 to flatten on pressure applied to the apex members F, G. The advantage of the arched springs 140, 150 of FIGS. 22-28 is that the whole assembly can collapse down to a very low profile. For example if the spring and hinge members in FIGS. 22-28 were 3 mm thick, and the expanded height is 18 mm, then the compression ratio would be a very high 6:1. FIGS. 22-28 do not show a damping means but various one-way energy dissipation means or dampers 114, as described above, could be used in combination with these energy storage and return means.

Figure 29:
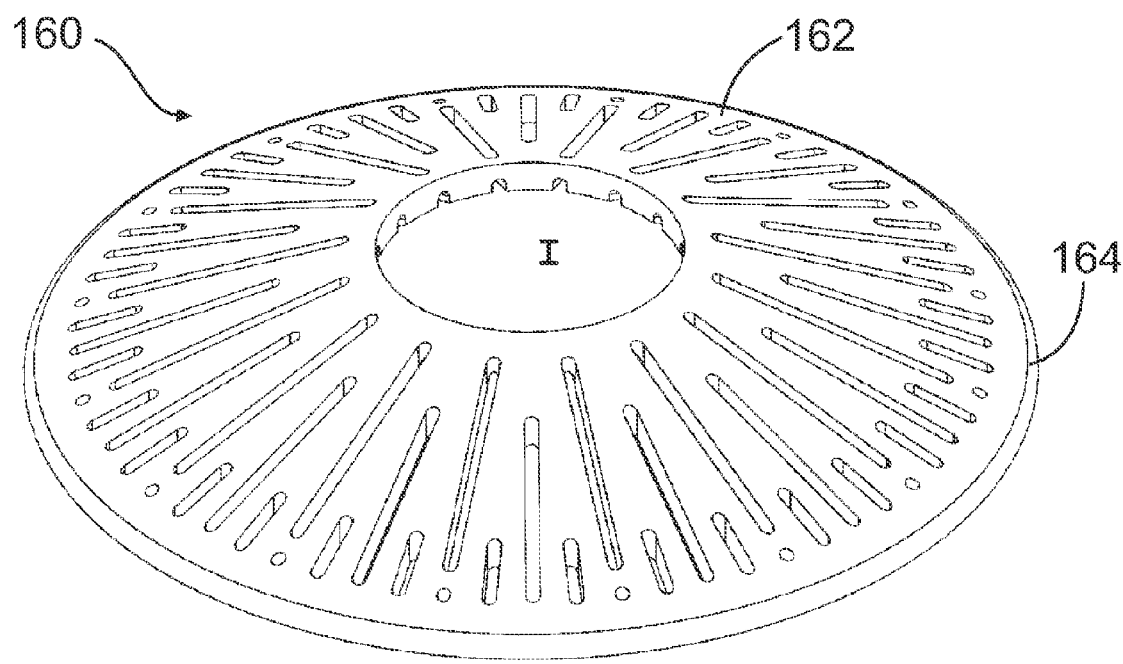
FIGS. 29 and 30 show respectively perspective and top views of embodiments of a conical disk with integrated spring element.
Figure 30:
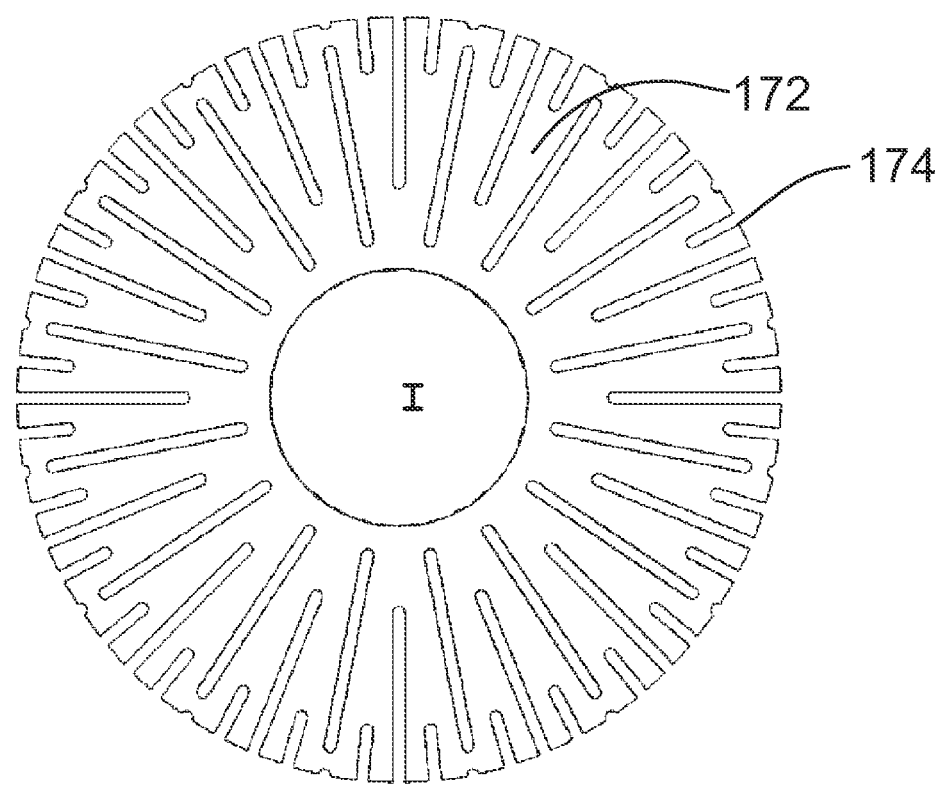
Figure 31:
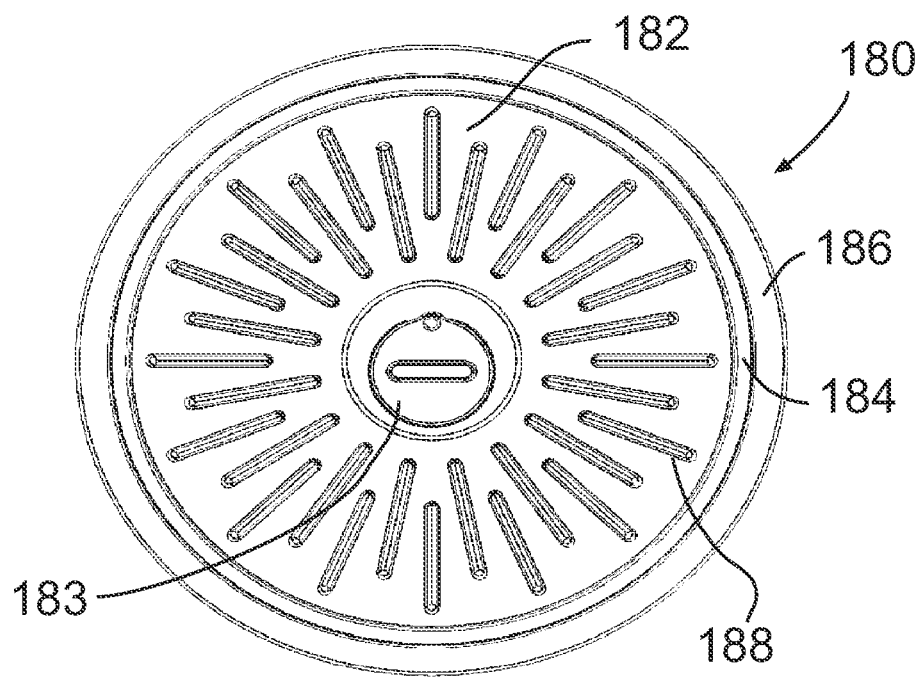
FIGS. 31-34 show respectively top, side, perspective and sectional views of a sealed conical disk and ring spring together with a sealed bottom component to provide an air chamber within an energy storage and return component.
Figure 32:
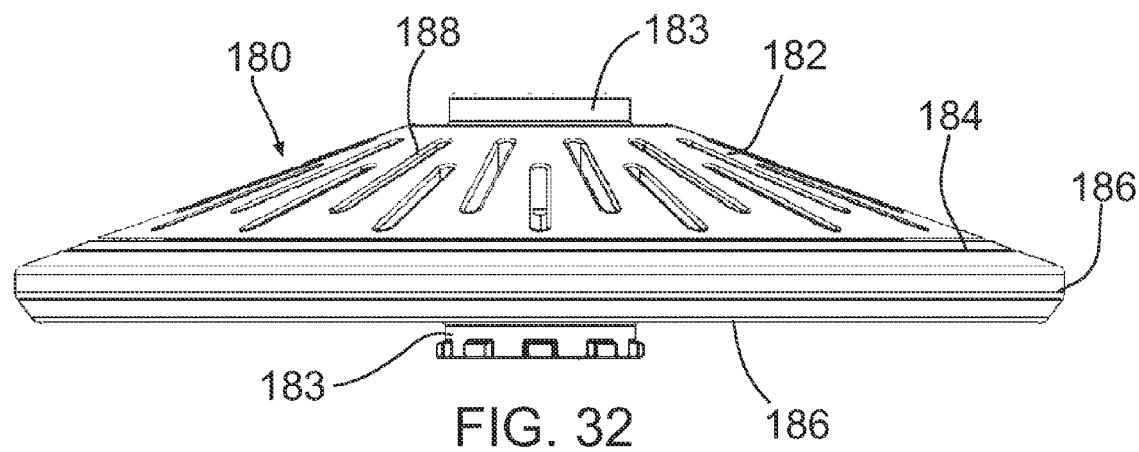
Figure 33:
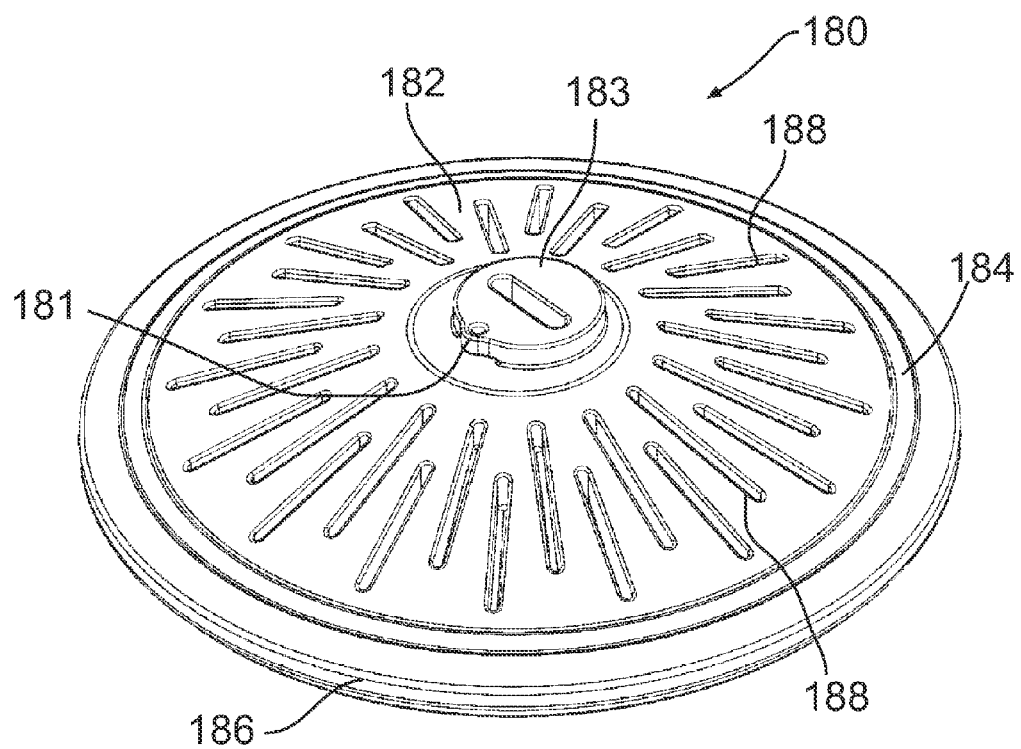
Figure 34:
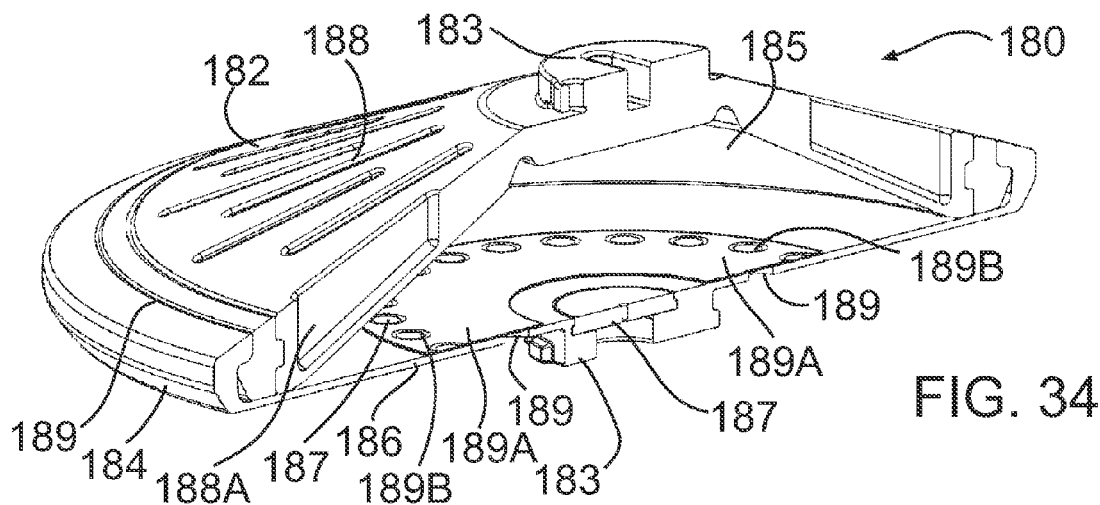

A further simplified embodiment of a spring 110 is shown in FIGS. 29 and 30 in the form of an integrated conical disk 160 and ring 164. The embodiment of FIG. 29 uses a conical disk 162 and an integrated outer ring spring 164. Both of these components can be molded as one piece from the same material, preferably Delrin™ but many other materials may be used instead. A combination of materials can also be used in a double or multi-shot injection molding process. Benefits of this embodiment include simplicity and low cost. The conical disk 172 shown in FIG. 30 is a sectional view of the disk 162 without the integral periphery. Important features of this embodiment are not limited to, but include the following: the conical disk element 172, if it were separated from the integrated outer ring spring 164 as shown in FIG. 30, would compress to a planar or nearly planar shape with less applied force than a conical disk of the same dimensions, made of the same material, but with no slots and/or pockets. This is because the radial interruptions 174 allow the conical disk to expand circumferentially as it is compressed. In this way, the noninterrupted outer ring spring portion 164 is caused to stretch radially and circumferentially as the conical disk 162 is compressed so the ring spring 164 stores more of the total energy applied to the top of the conical disk 162 than if the conical disk 162 was not interrupted which helps the achievement of a decreasing spring force at some point in the compression of the spring. Another important feature is the necessity to allow or account for a high level of strain near the center of the conical disk 162 (the area next to the internal diameter of the disk 162 if it has a center hole I as shown in FIGS. 29 and 30). This area is subjected to high compression forces as well as high bending loads and must be made from a material, such as, but not limited to, polypropylene or other negative Poisson's ratio material, or it must have breaks, slots, or partial ball-joints to prevent compression movement but allow high bending loads and/or movement. A double shot molding process which allows the internal diameter high-strain areas to be made of a material such as, but not limited to, polypropylene, and the outer ring spring area to be made of a material such as, but not limited to Delrin™, is preferable for this one-piece disk configuration.

FIGS. 31-34 show an energy storage and return spring 180 which uses a sealed conical disk 182 and ring spring 184 together with a sealed bottom component 186 to provide an air chamber 185 within the energy storage and return spring 180. This air chamber 185 is used to dissipate a portion of the compression energy as the user's mass and inertia is decelerated during a foot strike. An important feature of the conical disk 182 is that it is relatively rigid in radial compression, but relatively elastic circumferentially so that without the ring spring 184, the conical disk 182 can be flattened with significantly less force than if the ring spring 184 is fitted to the outer edge of the conical disk 182. The ring spring 184 may be mechanically secured to the conical disk 182 outer edge as shown here and/or molded to the conical disk in a double shot molding process. In this embodiment, the outer ring spring 184 expands and twists or flares out from the bottom as the conical disk 182 compresses. This is advantageous as compared to a sliding or pivoting motion because the reduced friction increases the energy storage and return capability of the assembly. The bottom member 186 may be a rigid urethane type of material, although many other materials may be used. The bottom member 186 is sealed against the ring spring 184 to complete the air chamber 185. The bottom member 186 also may assist in providing secure positioning of the disk 180 using an eccentric locator 183.

Figure 59:
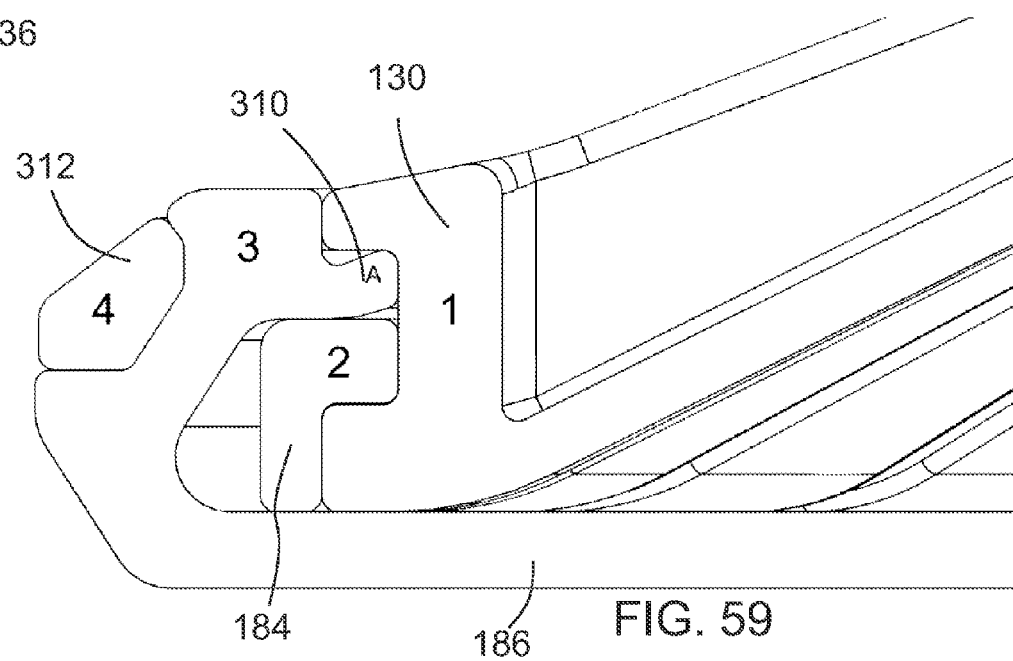
FIG. 59 shows a cutaway view of the edge of a conical disk in which the interior of the disk comprises an air chamber and there is a self-energizing seal at the edge of the disk.

FIG. 59 shows a self-energizing seal 310 between a conical disk 130 and a bottom member 186 in which air pressure in the chamber formed by the conical disk and the bottom member acts on the seal to enhance the sealing force. In this embodiment a rigid retaining ring 312 prevents the bottom sealing element 186 from expanding under air pressure.

Figure 62:
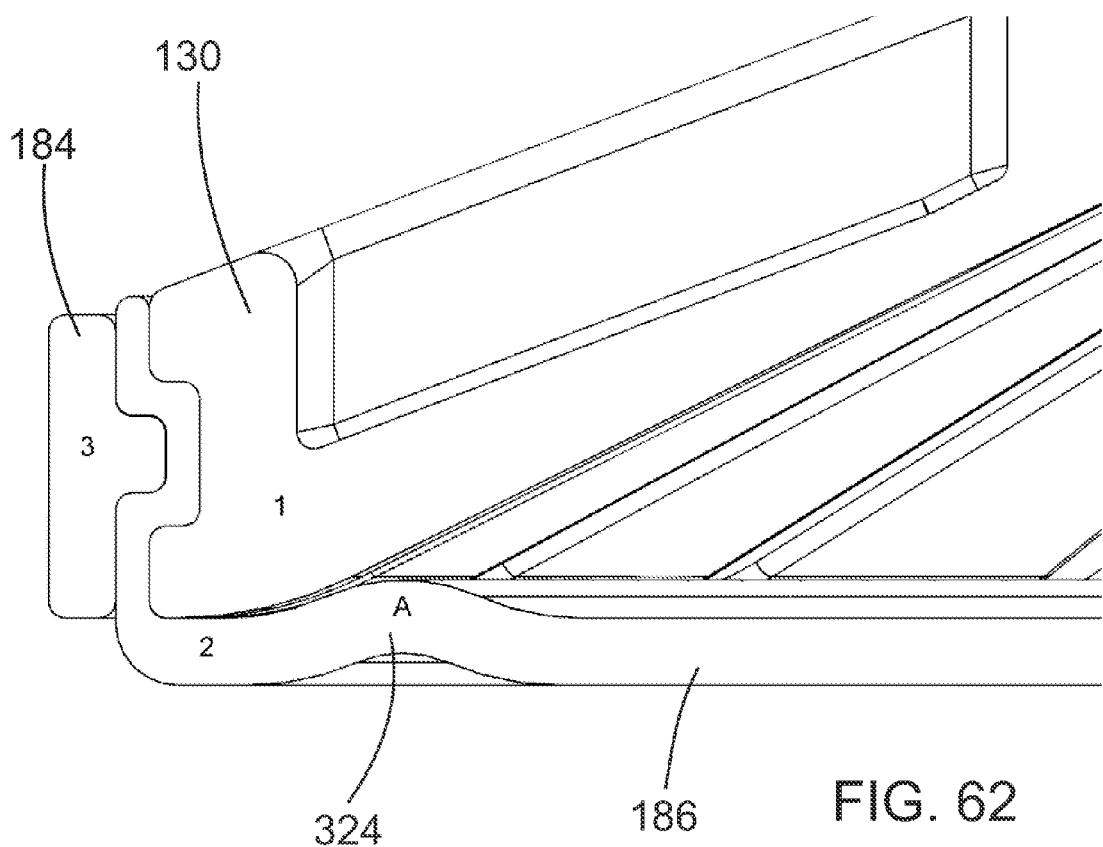
FIG. 62 shows a cutaway view of the edge of a conical disk in which the interior of the disk comprises an air chamber and there is a seal at the edge of the disk in which the sealing force is supplied by a ring spring.

FIG. 62 shows an embodiment in which a seal between a bottom sealing element 186 and a conical disk 130 is maintained by a force supplied by a ring spring 184 to the bottom sealing element. The bottom sealing element may contain an expanding element 324 in order to enable easier expansion of the seal as the conical disk flattens.

An ideal amount of force required to compress the conical disk member 182 on its own to full or nearly full compression is approximately between 10% to 50% of the maximum force required to compress the conical disk 182 when it is assembled together with the ring spring 184. Ideally, the conical disk 182 and spring 184 are constructed to allow the conical disk 182 to be nearly flat at full compression. This allows the disk spring 184 to be at maximum elongation without exerting a significant vertical force through the conical disk 182. Some vertical force is preferred, however, and this can be provided by the conical disk member 182 which resists being flattened. Other materials may be used, but a polypropylene or other negative Poisson's ratio material is a preferred material for the conical disk 182 because it allows the high strain areas to become living hinges. The radial slots 188, or other shapes which allow circumferential expansion (not shown), are designed to be high strain areas which allow the conical disk member 182 to be deformed from a conical shape to a more planar shape.

By using blind slots 188 (from the top, as shown at 188A, or from the bottom, or from the top and bottom) as opposed to through slots, the conical disk 182, in combination with the ring spring 184 and possibly a separate base member 186, is able to provide a sealed air chamber 185 as it compresses. The slots 188 may also be sealed by a membrane on the inside of the disk 182. During compression, the air in the sealed chamber 185 is compressed to an elevated pressure and is forced to escape through a restriction such as, but not limited to, an orifice or orifices 187 or a porous material (not shown). This provides a compact and light weight method of dissipating a portion of the compression energy. At full compression, most of the air in the chamber 185 will have been discharged through the restriction 187 so that it will have absorbed the impact of the foot strike. Once the mass of the user has been decelerated by the combination of the disk force and the damping force of air exiting the chamber 185, the air (which has now been discharged from the air chamber) will no longer contribute to the vertical force of the disk on the user's foot. This allows the disk 182 to stay compressed until the user begins to unweight their heel (as their center of gravity moves forward of their ankle) and the disk 182 will then expand vertically and propel the user forward. As the disk 182 expands to its original shape, one or more valved air flow openings 189 in the base member 186 in a flexible one-way valve member 189A seated in the base member 186 allow unrestricted air to re-enter the chamber. The openings 189 are sealed during compression of the disk 182 by the flexible one-way valve member 189A. During expansion, some restriction in the flow of air through the openings 189 may be desirable in some applications to slow the energy return slightly. Areas 189B may be used as attachment points to hold the seal 189A on the bottom 186 of the disk 180, for example by welding or adhesive.

Other possible features of this embodiment include an eccentric locator 183 on the top and bottom of the disk with a detent positioning system (using flexible protrusion 181 as a detent) to allow the disk 182 to be fine tuned from side to side to compensate for pronation or supination. The locating eccentric 183 on the bottom may also have a quick-release engagement system which allows the disk to be removed or inserted (by turning the disk to a non-detent position) but holds it securely when in any of the detent positions. Adjustable valving of the openings 189 and restriction 187 can also be used to control the air flow in and out of the damping chamber 185.

Figure 35:
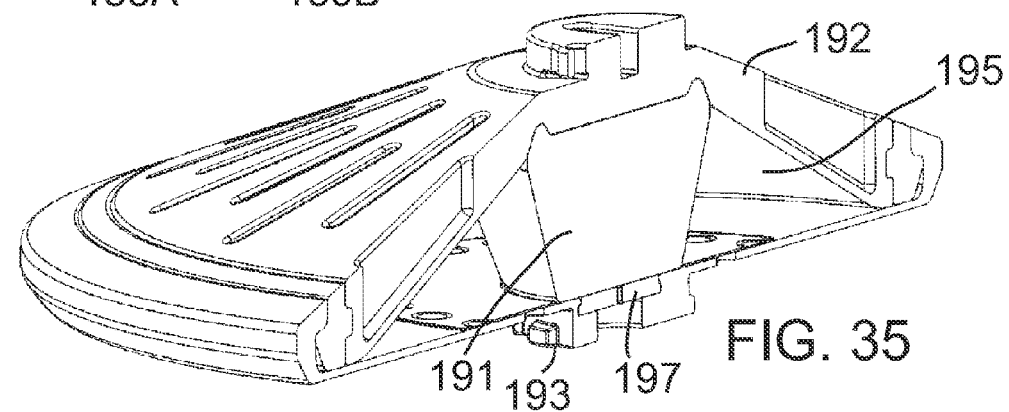
FIG. 35 shows a perspective, cut away, of a sealed conical disk with controlled air flow.

The air flow from the chamber of a sealed conical disk 182 may be modulated by a computer controlled valve which adjusts for various user and terrain variables. A simple but effective self-adjusting airflow resistance system is shown in FIG. 35. Sealed conical disk 192 is constructed in like manner to sealed conical disk 182 of FIGS. 31-34. Sealed conical disk 192 uses a compressible porous material 191 such as, but not limited to an open-cell polyurethane foam, as a pre-resistance member for air flowing out of the chamber 195 through the orifice 197 and/or rigid porous material member/s 191. The air flow resistance through this compressible material 191 increases as it is compressed during disk compression so the energy dissipation (damping effect) increases as the disk 192 nears full compression. This will have the effect of gradually decelerating the mass of the user to reduce or eliminate impact at full compression. Due to the characteristics of this airflow damping system, it is predicted that the same configuration can be tuned to adequately damp the foot strike of a user regardless of whether they are walking (with a low velocity/impact foot strike) or running (higher velocity/impact foot strike).

Figure 36:
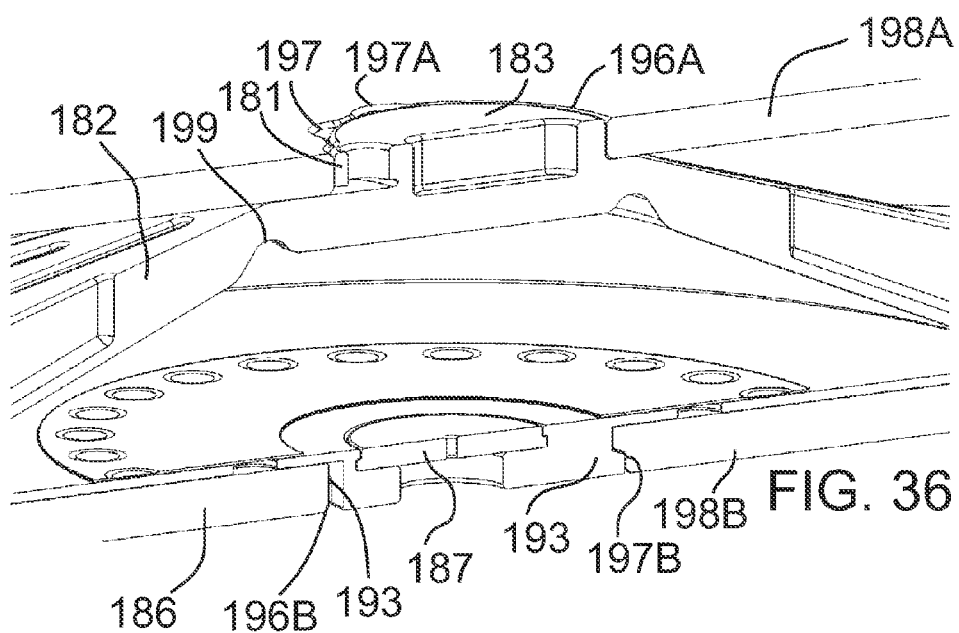
FIG. 36 shows a close up, cut away, of the embodiment of a disk of FIGS. 31-34 seated in a sole.

In FIG. 36, the spring embodiment 180 of FIGS. 31-34 is shown with the detent 181 fitted tightly adjacent one of several recesses 197A in a supporting portion 196A of an upper part 198A of a sole. Knobs 193 may be twisted into slots 197B of a supporting portion 196B of a lower part 198B of the sole, with the detent 181 holding the spring 180 within the sole, which may be a sole 102 of FIGS. 1-4 for example. FIG. 36 also illustrates a circular thinning 199 of the material of the disk 182 that provides a radial live hinge in a high strain area of the disk 182.

Figure 37:
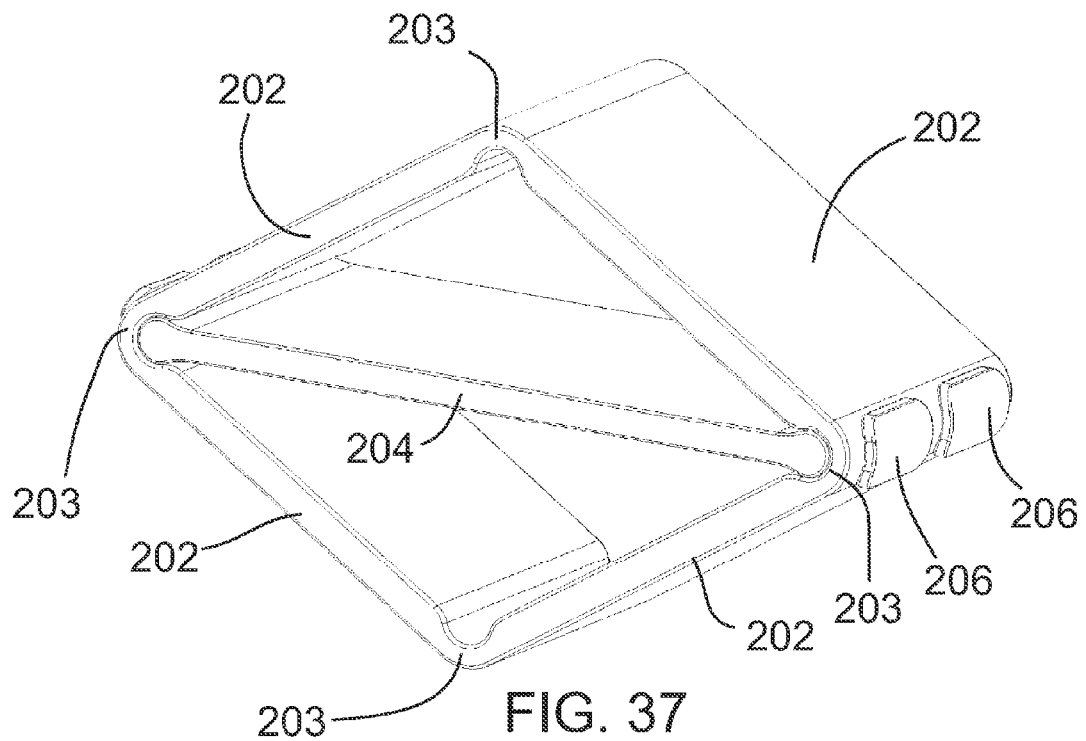
FIG. 37 shows a perspective view further embodiment of a spring.
Figure 38:
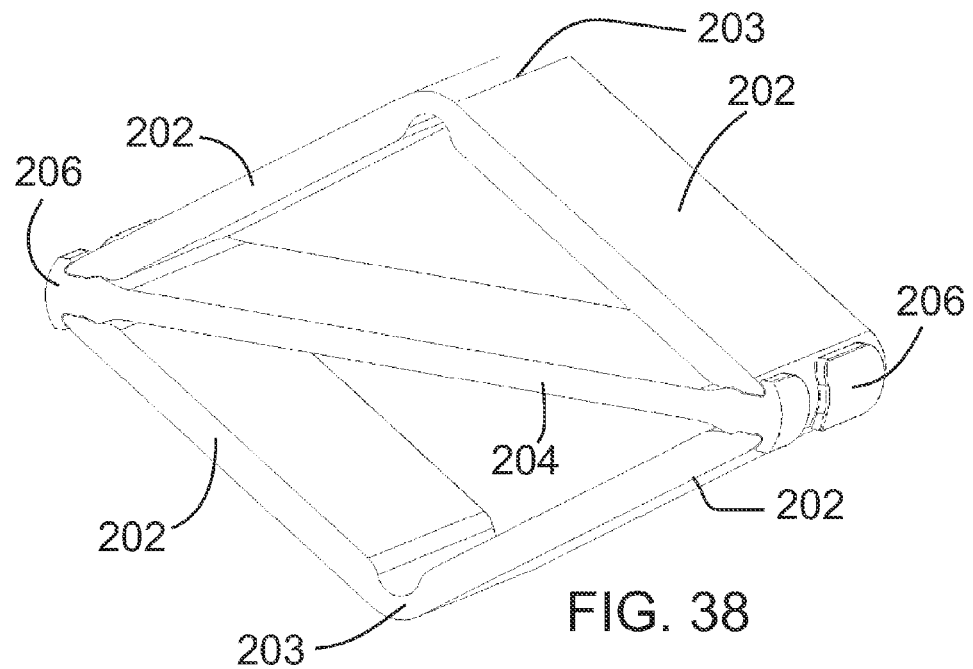
FIG. 38 shows the embodiment of FIG. 37 in section.
Figure 39:
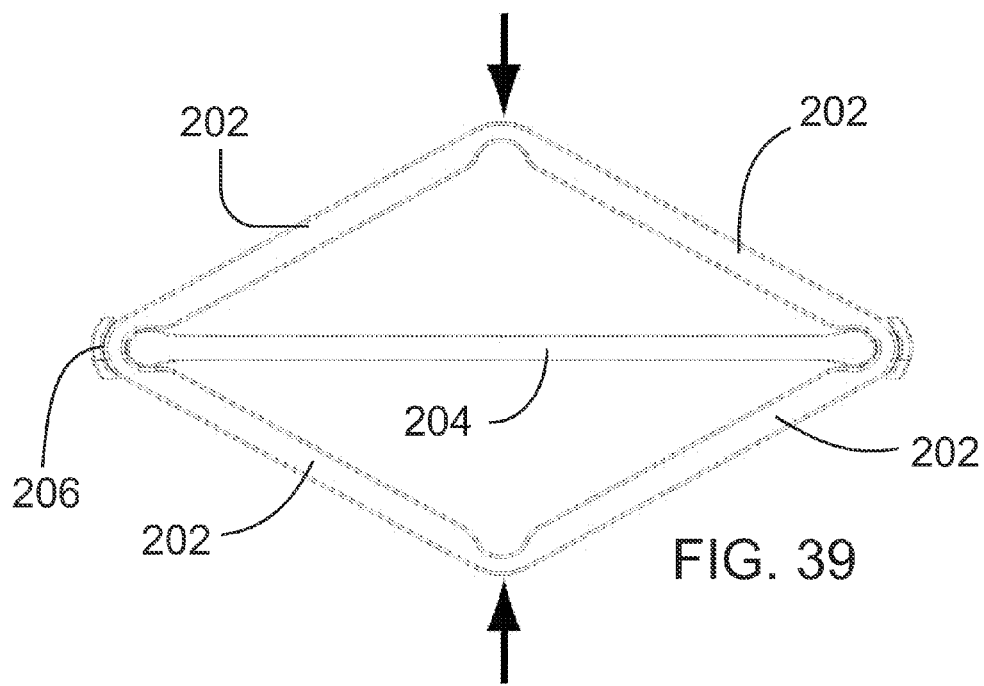
FIGS. 39 and 40 show the embodiment of FIGS. 37 and 38 at zero and full compression respectively.
Figure 40:
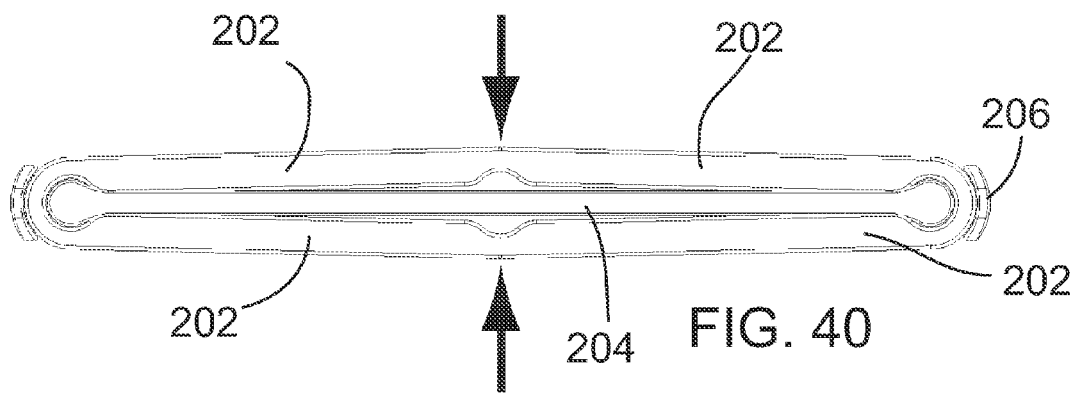

Further embodiments of a spring 110 are shown in FIGS. 38-40. In FIG. 37, rigid planar members 202 are hinged together at locations 203 and secured on their inside to an elastic member 204 that is extended when the members 202 are compressed together. The planar members 202 form a dome, which in this instance is shaped like a ridge. Knobs 206 may be used to hold the spring element 204 in place. A cut-away of the embodiment of FIG. 37 is shown in FIG. 38 to show the knobs 206. FIG. 39 shows the embodiment of FIG. 37 at zero compression, while the embodiment of FIG. 40 shows the embodiment of FIG. 37 at full compression. In the case of the ridged rigid elements shown in FIG. 37, the hinges 203 at the outer sides, closest to the elastic element 204 have a hinge axis very nearly in line and near the center plane of the spring to avoid one of the sides of the spring overpowering the other and creating a toggling effect.

Figure 41:
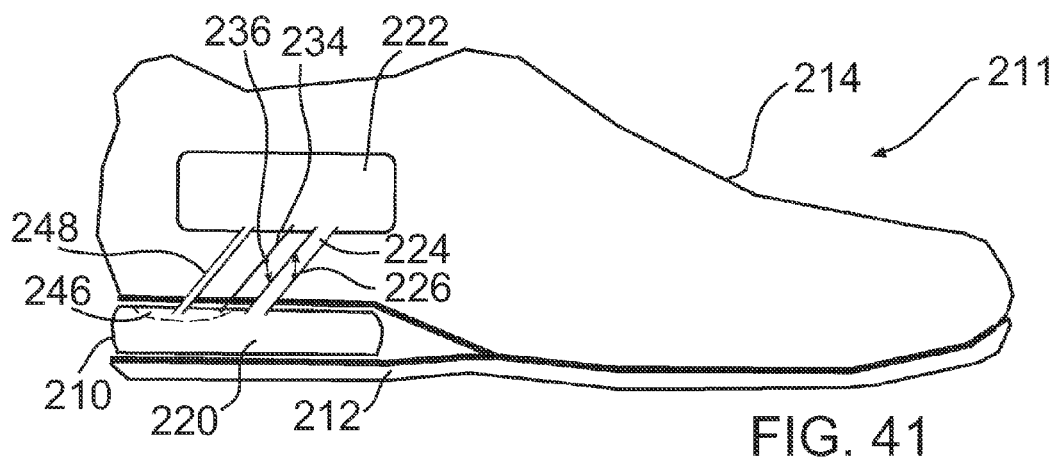
FIG. 41 shows a spring shoe with an air chamber compression system.
Figure 42:
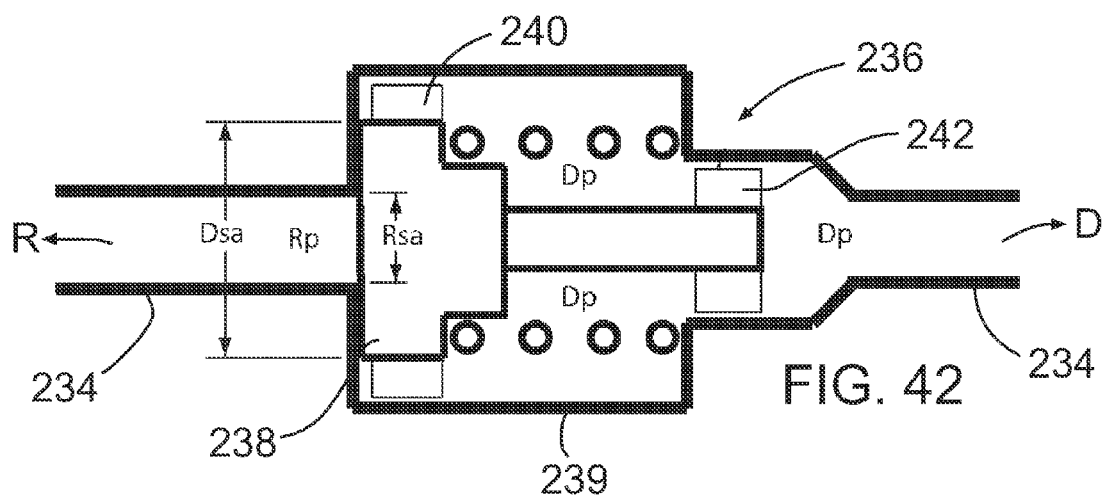
FIG. 42 shows a detail of an air transfer mechanism for use in the spring shoe of FIG. 41 in a first position.
Figure 43:
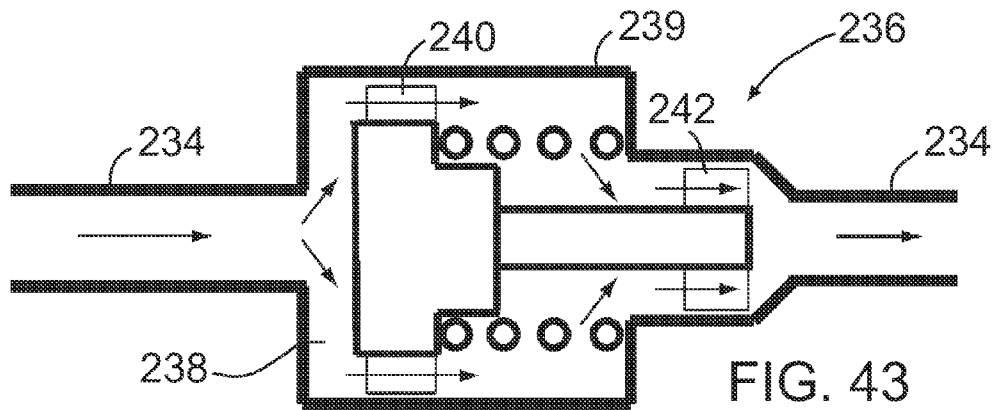
FIG. 43 shows a detail of the air transfer mechanism of FIG. 42 in a second position.

In a further embodiment, a spring 110 is formed using an air diaphragm system. An embodiment of an air diaphragm system 210 is illustrated in FIGS. 41-43 in shoe 211. Shoe 211 includes sole 212 and upper 214. Inside the sole 212 is an air diaphragm or bladder 220 connected to a reservoir 222 via a first conduit 224 and a return conduit 234. A one way valve 226 lies in the conduit 224, and a one way valve 236 lies in the return conduit 234. The conduits 224 and 234 could be provided as a single conduit with two one way valves 226 and 236 in the conduit. The reservoir 222, conduits 224, 234 and valves 226, 236, are integrated into the shoe 211 as for example into the upper 214. The one way valves could also be replaced with a single double purpose valve.

The spring air diaphragm system 210 uses the vertically downward energy from the foot strike to force a portion of the air in diaphragm 220 into the air reservoir 222 through conduit 224 and one way valve 226. As a result, a portion of the energy which the user applies to compress the air diaphragm 220 is contained and stored in the air reservoir 222 and the the now deflated air diaphragm 220 remains at this lower volume until return valve 236 is activated. As the user's center of gravity moves forward of the user's ankle (this example takes place on a flat surface, for simplicity of explanation) the pressure in the air diaphragm 220 will start to drop rapidly as a result of the user's weight rolling forward and off of the heel. When the pressure in the air diaphragm 220 becomes significantly lower than the elevated pressure in the air reservoir 222, the return valve 236 opens and the elevated pressure air in the air reservoir 222 rushes back into the air diaphragm 220, creating a vertical force which propels the user with an upward force having a forward component.

The design of return valve 236 is a critical element of the air diaphragm spring system 210. Ideally it is designed to seal completely until the pressure in the air diaphragm 220 reaches a certain percentage of the pressure in the air reservoir 222 (such as 60%, but higher and lower may work as well depending on various other design considerations). When the return valve opens, it creates very little resistance to flow until the pressure in the air diaphragm 220 and the air reservoir 222 have equalized. When this has happened, the valve 236 closes again.

A preferred construction of such a valve 236 is shown in FIGS. 42 and 43. In FIG. 42, the valve 236 has a valve sealing element 238 guided within valve body 239 by guide vanes 240 and 242. A spring 244 biases the valve sealing element 238 to close the valve 236 unless the reservoir pressure reaches a predefined excess over the diaphragm pressure. $R_p$ denotes the pressure on the reservoir side R of the valve 236. $D_p$ denotes the pressure on the diaphragm side D of the valve 236. $R_{sa}$ is the surface area on the valve sealing element 238 on which the pressure $R_p$ acts. $D_{sa}$ is the surface area on the valve sealing element 238 on which the diaphragm pressure $D_p$ acts. The sealed surface area of the air diaphragm side is greater than the sealed surface area of the air reservoir side. The return valve 236 is in the closed position when $R_{sa} \times R_p$ is less than $D_{sa} \times D_p$ plus the force of the spring 244. The return valve 236 is in the open position when $R_{sa} \times R_p$ is greater than $D_{sa} \times D_p$ plus the force of the spring 244. In the open position, air may flow from reservoir 222 to diaphragm 220. Due to the greater surface area of the $D_{sa}$, this allows the pressure in the reservoir 222 to be significantly higher than the pressure in the diaphragm 220 before the valve 236 opens, thus producing the desired delay between the compression of the diaphragm 220 and the re-inflation of the diaphragm 220. The return spring 244 supplies enough force to reseat the valve once the air pressures have equalized. The return spring 244 is preferably light enough to allow the valve 236 to stay open until the pressure in both air chambers 220, 222 has nearly equalized and the air stops flowing from the reservoir 222 to the diaphragm 220. Once the return valve 236 closes again, the diaphragm is ready for another foot strike.

The valve sealing element 238 may be a rigid or semi rigid disk or cylinder with a flat end with a significantly larger sealed diameter than the hole it seals from the reservoir 222 to the diaphragm 220.

The sealing surface of the return valve 236 is preferably flat, but may also be conical or some other shape. Many different spring and flow configurations are possible, which use a similar surface area differential. A pre-set or adjustable flow resistance mechanism may be used which will increase the resistance of the flow enough to prevent the diaphragm to re-inflate too rapidly.

In some embodiments, it may be desirable to have airflow resistance change depending on how much pressure is in the system or how fast the air is flowing from reservoir 222 to the diaphragm 220. This may be accomplished a number of different ways including an airflow path which is turbulent enough that higher flow rates create significantly higher flow resistance, or a construction where high flow rates actually reduce the resistance of the air flow so more air is transferred faster.

An optional but preferred element of the diaphragm spring 210 is a full compression air pump 246 under the heel of the shoe 211. The full compression air pump 246 increases the pressure of the entire system by adding atmospheric air (other compressible gases may also be used, but air is preferred because it can be supplied by and vented to atmosphere) to the diaphragm 220 and/or to the air reservoir 222 any time the air diaphragm 220 reaches full compression. There may be more than one diaphragm 220 and reservoir 222 in a spring shoe. The air pump 246 allows the shoe to self adjust for various user weights and for when the user is walking or running etc.

A preferred design goal, for foot wear incorporating a spring 110, is to use as much of the available "travel" as possible at all times, whether the user is walking, running or jogging etc. If a full compression air pump is used, a method of reducing the air pressure such as a vent valve (not shown) may be provided when the user is no longer running (for example) and is no longer using the full "travel" of the diaphragm. In this case it is necessary to bleed off enough air to the atmosphere until the user is once again compressing the diaphragm 220 completely. This can be accomplished by a constant bleed system, but is preferably accomplished with an electronically activated miniature valve which is controlled by a CPU. The CPU will detect that full compression is no longer happening and will open the vent valve to reduce the system pressure. This sensing can be done a number of different ways including with a contact or proximity sensor between the bottom of the reservoir and the top of the reservoir, or by a pressure sensor in the soul, or by sensing whether or not there is airflow from the pump, or by sensing whether the one-way valve from the pump to the reservoir and/or the diaphragm is activated on each step.

In this way, the foot strike shock is very effectively dissipated, and energy is stored for release until the user begins to un-weight their heel. In actuality, the ideal release of the air pressure from the reservoir 222 to the diaphragm 220 may begin before the user's center of gravity is forward of the heal, as long as there is a momentary delay, and as long as a portion of the energy which has been stored in the reservoir is released after the user's center of gravity is forward of the ankle.

The intake for the atmospheric air pump 246 should be filtered, preferably through a relatively large surface area of waterproof/air-permeable material such as Gortex™ fabric by Dupont, to prevent any foreign matter such as dust or water from entering the system. This filter (or membrane) is preferably of a large enough surface area (for example as a panel on the outside of the shoe) to allow sufficient air flow for the highest air flow which the pump 246 will generate during use. Similarly, a filter of some sort, such as venting air to the inside of the shoe and drawing it back in through a filter, should be used for an air sealed embodiment disc as for example shown in FIGS. 32-36

Diaphragm 220 may be of many different shapes and sizes, and may also be used under the forefoot. The diaphragm 220 may be of a flexible, expandable material, but is preferably a flexible, non-elastic material, such as a fabric reinforced rubber or elastomer, so as little compression energy as possible is stored in the stretching of the diaphragm. Instead, as much energy as possible is preferably stored in the elevated pressure reservoir 222.

The elevated pressure reservoir 222 may be of many different shapes and sizes and preferably of a rigid or semi-rigid material but possibly even a flexible/expandable material(s). It would preferably have a volume which is similar to or smaller than the air volume of the diaphragm 220 which are linked to it. The ideal volume may be determined by testing.

The elevated pressure reservoir 222 may also be integrated into the shoe upper 214 or sole 212 by using small diameter (preferably ⅛" ID but larger or smaller is possible) tube which is molded or bonded into the soul or integrated into the upper by stitching or bonding or other method. Such a tubing reservoir could be mounted anywhere on the shoe 211, but would preferably wrap around the outer upper edge of the sole 212 and be long enough to contain the required volume for the desired energy storage characteristics. The air reservoir 222 can also be located under the forefoot as part of the shoe sole 212.

The one-way valve 226 may be of a ball type or a flap type or any other type of one-way valve configuration. It is also preferable to have a preset, or adjustable flow mechanism which will increase the resistance of the flow enough to prevent the diaphragm from reaching full compression before the user's energy has been completely stored (or in other words, to keep the "suspension" from "bottoming out").

It may be desirable for this airflow resistance to change depending on how much pressure is in the system or how fast the air is flowing from the diaphragm 220 to the reservoir 222. Ideally, the airflow will be fast enough to use the entire travel on each foot strike, but slow enough to prevent the diaphragm 220 from compressing too rapidly in the case of sudden high flow rates. This may be accomplished a number of different ways including an airflow path which is turbulent enough that higher flow rates create significantly higher flow resistance.

The vent valve (not shown) is used to reduce the system pressure any time higher pressure is no longer necessary. Many different types of valves may be used, such as the "X-valve" by Parker Hannifin, or possibly a miniature piezoelectric valve. The valve can reduce the system pressure over a duration of several user steps or more, and does not, therefore, need to be very high flow.

A simple delayed opening return valve has been presented. Other methods with active electronically controlled valves or different pressure sensors to indicate the correct timing of energy release may also be used.

Instead of venting or drawing air from the atmosphere, it may be preferable for certain applications to use a sealed, closed system using a fluid or fluids other than air. With this arrangement it would also be possible to use other gases such as nitrogen. Other energy storage systems may be used such as the movement of a noncompressible fluid which is used to compress a mechanical spring or pressurized gas or expand a flexible chamber.

Figure 44:
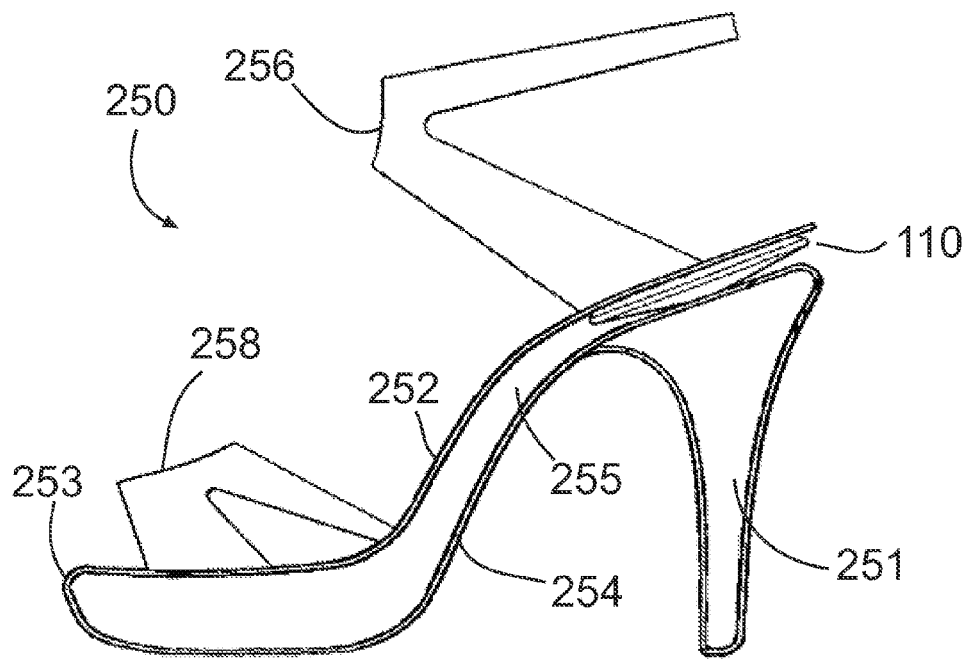
FIG. 44 shows a side view of a high heel shoe incorporating a heel spring.

Referring to FIG. 44, a high heeled shoe 250 is shown that incorporates a spring 110. The spring 110 is designed according to the principles disclosed in this patent document, and may for example have any of the specific designs disclosed. The high heeled shoe 250 has a heel 251, and a sole formed of upper sole 252 and lower sole 254. Although many designs of the sole are possible, in the embodiment shown, upper sole 252 and lower sole 254 are made of a single elastic element that turns on itself at the toe end 253, and that has an air gap 255 between the upper sole 252 and lower sole 254. The spring 110 fits between the upper sole 252 and lower sole 254 and in this example sits directly on top of the heel 251, effectively forming part of the heel of the shoe 250. The shoe 250 is provided with an forefoot strap 258 and/or ankle strap 256.

Figure 45:
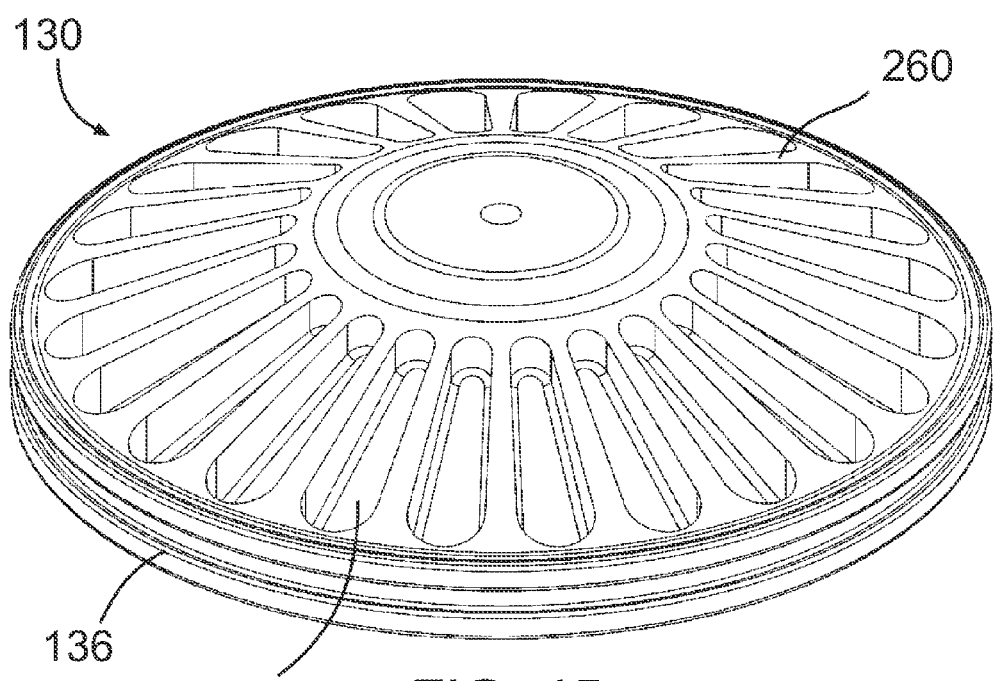
FIGS. 45 and 46 show respectively perspective and cut-away views of a conical disk with raised ridges instead of recessed slots.
Figure 46:
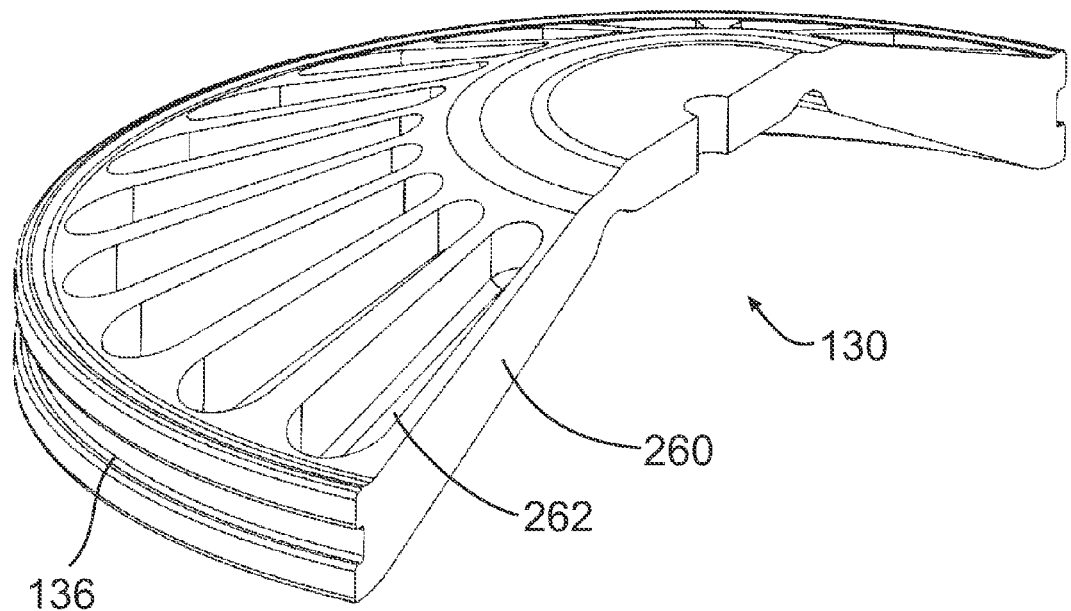

FIGS. 45 and 46 illustrate an embodiment of a spring 110 comprising a conical disk 110 and an elastic element 136 around the periphery that resists expansion when the disk is flattened. The disk comprises ridges or spokes 260 separated by gaps 262 that may be empty or have thinner or more flexible material than the ridges or spokes.

Figure 47:
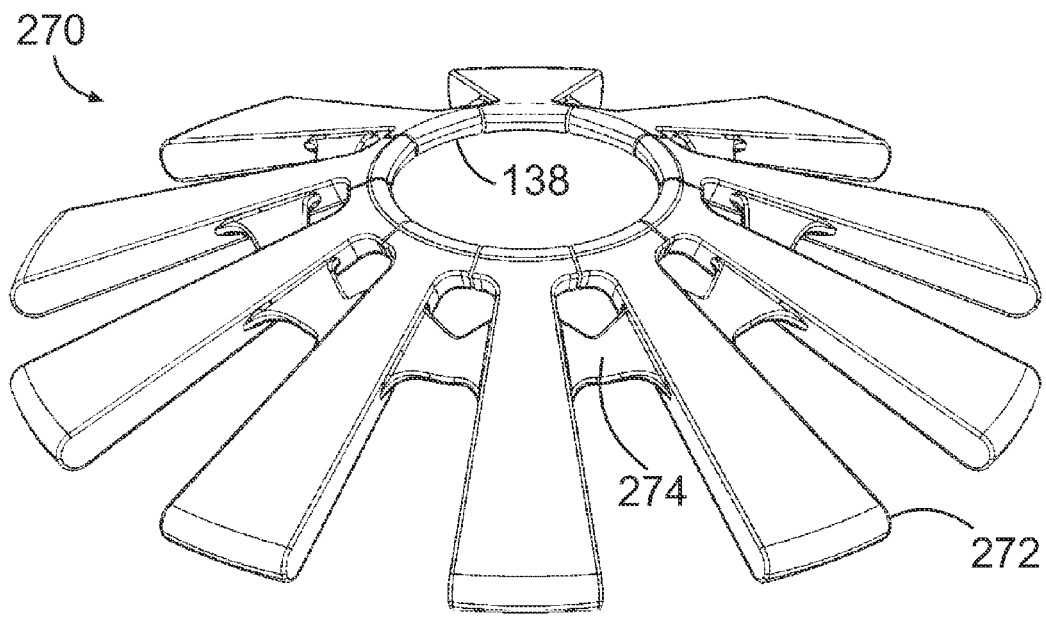
FIG. 47 shows a conical disk with radial legs or protrusions.

FIG. 47 shows an embodiment of a conical disk component of a spring 110 comprising a spiked disk 270 which comprises legs or protrusions 272 connected at an inner ring 138. The legs are connected by flexible connecting elements 274. The connecting elements 274 provide lateral stability to the legs. In order to resist compression of the disk, the spring preferably comprises an additional elastic element (not shown) such as a ring spring.

Figure 48:
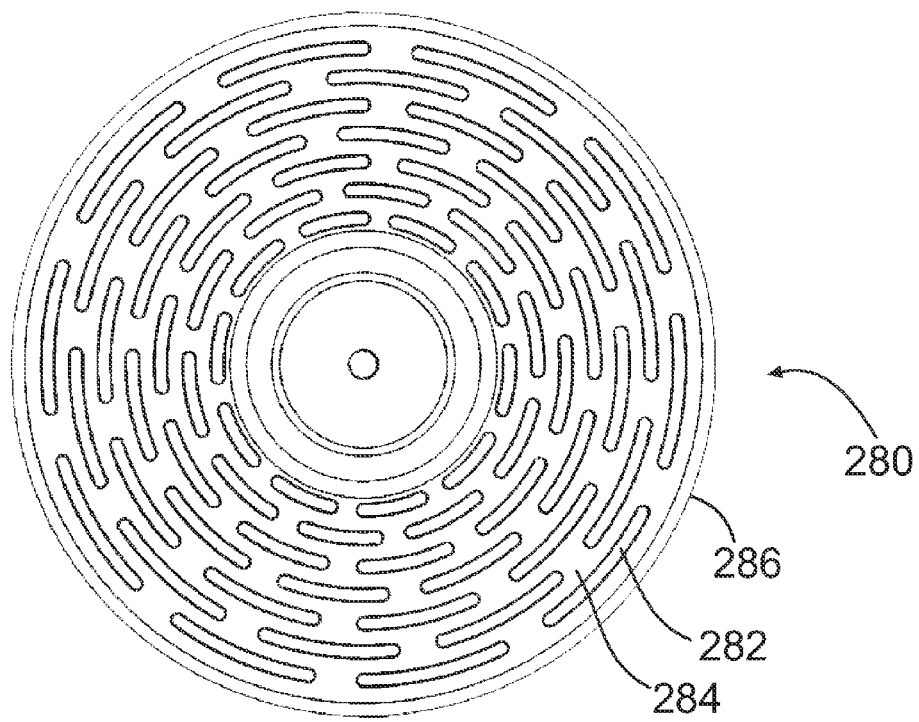
FIGS. 48 and 49 show respectively top and perspective views of a conical disk with circumferential slots.
Figure 49:
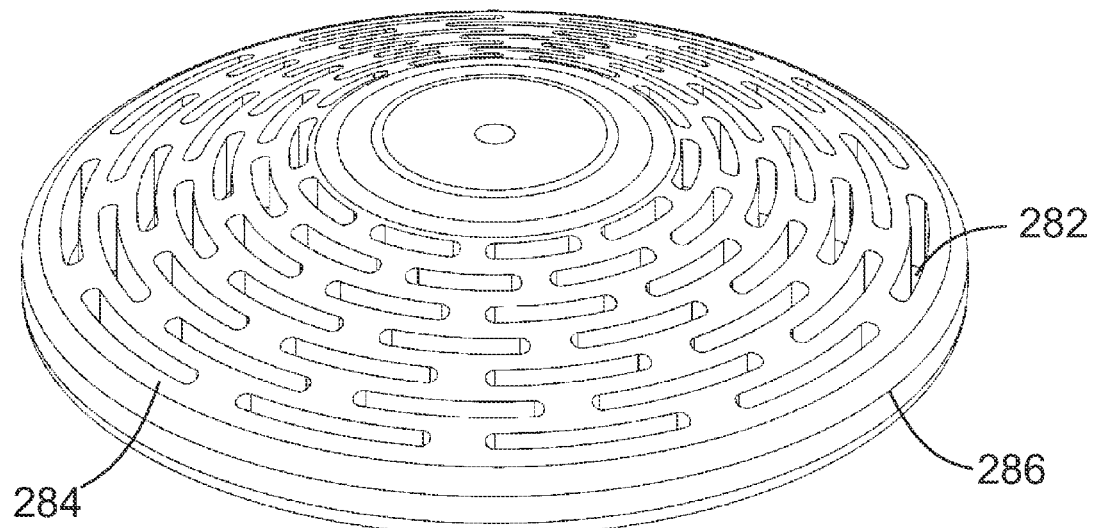

FIGS. 48 and 49 show an embodiment of a spring 110 comprising a slotted disk 280 in which circumferential slots 282 allow the sides 284 of the disk to compress radially when the disk is flattened. A relatively rigid outer ring 286 may be integrated into the disk as shown or may be added separately.

Figure 50:
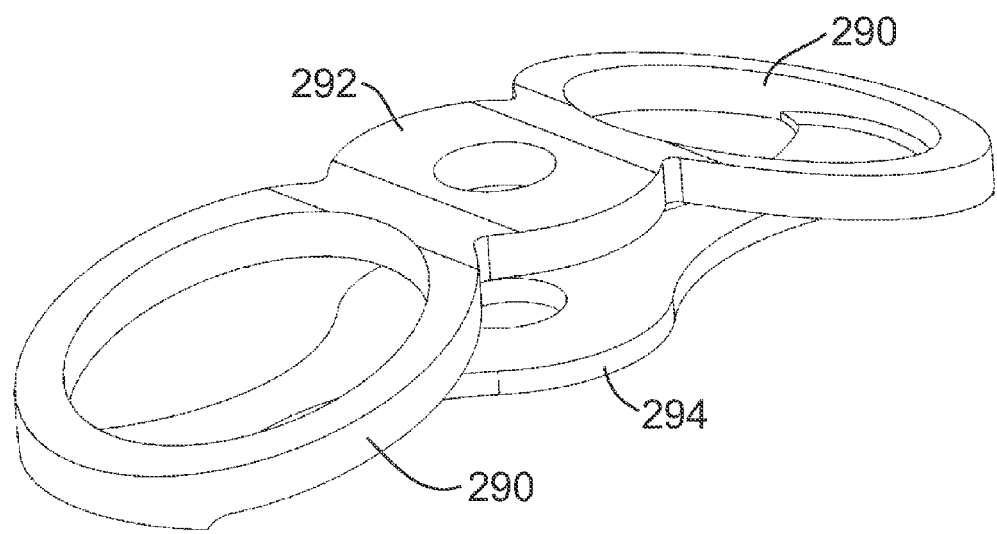
FIGS. 50-52 show respectively perspective, side and top views of an embodiment of a double loop spring.
Figure 51:
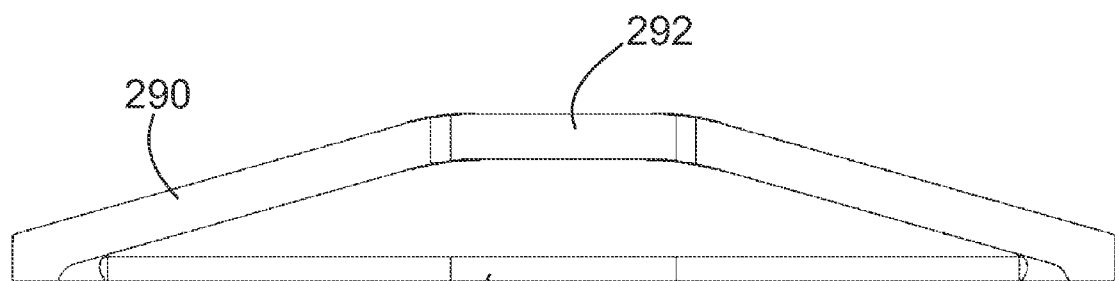
Figure 52:
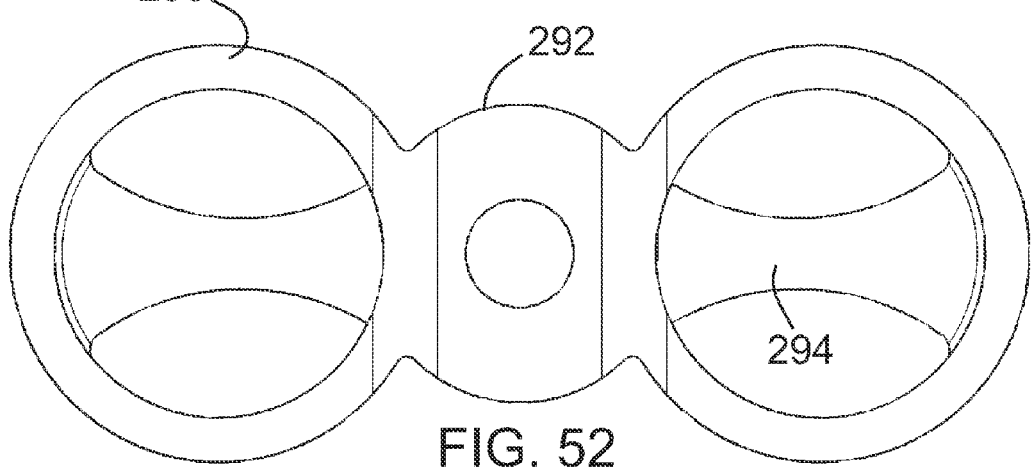

FIGS. 50 to 52 show a spring 110 comprising two loops 290 connected by inner 292 and outer 294 connectors. When the spring is flattened (i.e. the connectors are pushed together) the loops 290 are compressed. In this embodiment as shown, the spring is molded as a single piece of material; in other embodiments it can be an assembly of multiple components.

Figure 53:
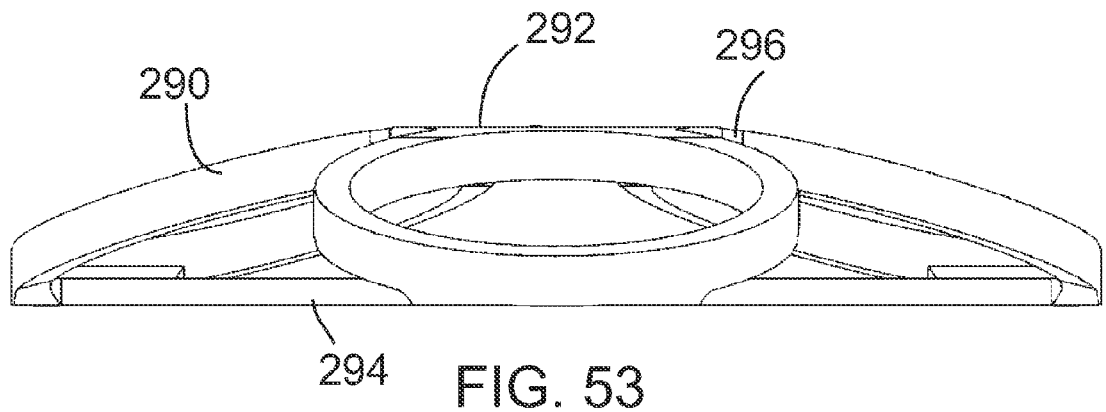
FIGS. 53-55 show respectively side, perspective, and rotated side views of a triple loop spring with a hinge at the center ring attachment.
Figure 54:
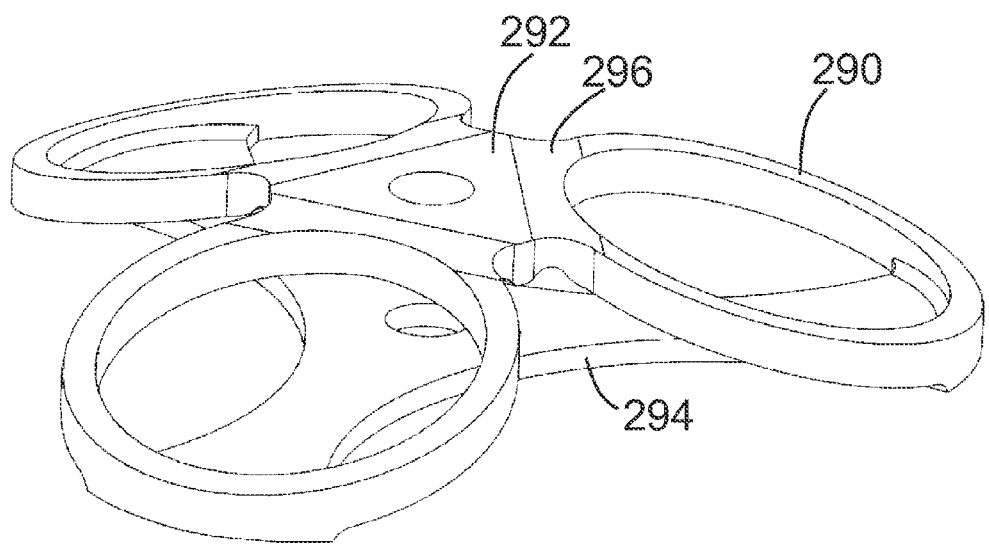
Figure 55:
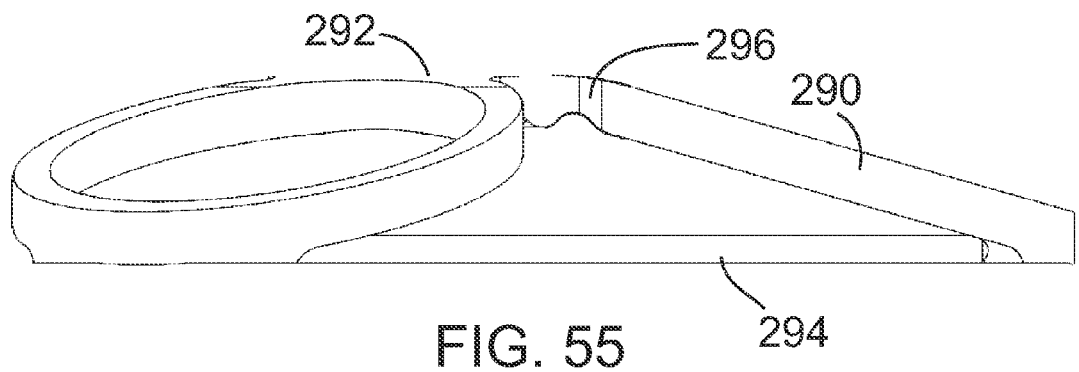

FIGS. 53 to 55 show a similar spring 110 as FIGS. 50-52, but with three loops 290 and a hinge 296 between a loop and the inner connector.

Figure 63:
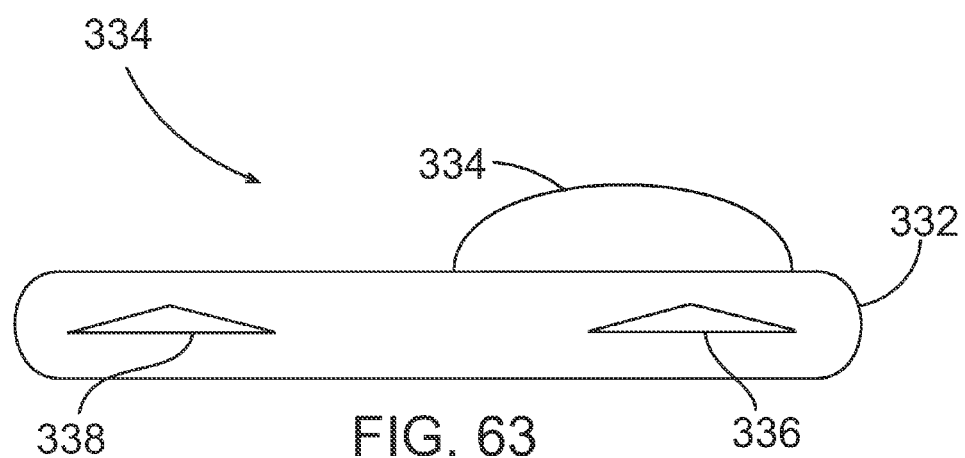
FIG. 63 illustrates a shoe with a spring in the forefoot.

FIG. 63 illustrates a shoe 330, which may be any type of footwear, with a sole 332 and upper 334, that has a spring 336 in the heel of the sole 332 and a spring 338 in the forefoot of the sole 332. The springs 336 and 338 may be made according to any of the springs disclosed herein. The shoe 330 may have such springs in the heel, in the forefoot, or in both, or include multiple springs in the forefoot, in the heel, or in both.

All of the devices and embodiments and possible variations (mentioned here or discussed, but not described in detail etc) may be used in combination with other shoe sole structures and devices such as air bladders, foam materials etc.

A lightweight, low profile reducing force spring may have value for many other applications beside shoes.

All of these examples may include a combination of different materials with different properties, or they may include components or members of the same material in various thicknesses and cross sections to produce different rigidity and extensibility characteristics. For example, a semi-rigid material could be used for the rigid compression load members as well as the extensible elastic members, if the elastically extensible section is constructed as a waved or bellows type of cross section, so it can be extended with primarily bending deformation of the material.

The rigid member in this disclosure refers to members which are rigid enough to withstand the compression load required to stretch the extensible member, without the compression load member buckling or bending significantly except as necessary, by design, to maintain the required force transfer from the foot strike to the extensible member.

Exemplary materials for the rigid or semi-rigid compression load members of the spring 110 include polypropylene or some other negative Poisson's ratio material, Delrin™ acetal resin, an injection moldable fiber reinforced nylon, or they may be metallic or other type of plastic or fiber reinforced composite. Material for the elastically extensible component/s is preferably Delrin™ acetal resin, but may be made of other types of plastics or metals or composites.

All of these systems may be sold with the option of various spring modules or elastic member stiffnesses to suit various users weights and uses and styles of walking or running. The speed of the energy release may also be controlled by the visco-elasticity of the extensible material. Lower visco-elastic properties may be preferable for high performance athletic footwear, while higher visco-elastic properties may be beneficial for shock absorption and consistent feel for more "pedestrian" applications.

Many people buy different types of shoes for different uses such as walking or running. The ideal starting point for a user to determine the spring stiffness for a particular pair of shoes for walking, is to choose a spring which just barely compresses completely with all of the users weight on one heel. This way, the weight of walking will compress the shoe sole. For running and jogging, a stiffer spring will likely be better suited. Spring shoes may also be particularly useful for high impact sports such as skateboarding. These applications may use stiffer springs than for running or jogging. In some cases, energy return may not be a benefit and can be minimized or eliminated, but the energy dissipation and lateral stability can be maximized for injury prevention.

Many other sole constructions are possible which exhibit a decreasing force spring for all or part of the compression of the heel and/or other portions of the sole. The methods described here are given as the preferred examples of decreasing force spring systems in terms of characteristics such as simplicity and cost. It is envisioned by the inventor that the entire sole could be molded or constructed with all or part of the sole having a decreasing force spring characteristic for all or part of the compression displacement. The spring 110 could also be used under other parts of the foot, such as the ball of the foot, to increase speed, efficiency and comfort of walking and/or running. Configurations of one or more embodiments of the invention may also be used in a multiple array or pattern of springs in a shoe sole.

Other benefits such as improved shock absorption due to a delayed rebound response, are also known to be a benefit of the spring 110.

The examples given are intended to show a variety of configurations of the spring 110. Other variations are not limited to, but include, right side up and/or upside down disk/s, non-perfect/symmetrical conical disks and/or non-circular ring springs, various materials including metallic conical disks or metallic ring springs, stacks of right side up and/or upside down disks for greater compression travel, and a separate damper component (such as but not limited to an air diaphragm/s) that is inside the disk/s or outside the disk/s, or enveloping the disk/s. Any or all of the embodiments disclosed here can be used in combination with one or more other energy storage and return components and/or energy dissipation components of the same or different design. Energy storage and return devices, preferably combined with one-way energy dissipation devices can be used in the heel and/or the forefoot of a human shoe. Variations of the energy storage and return devices and/or energy dissipation devices can also be used in specialty shoes such as dress shoes or high heeled shoes to provide similar benefits as when used in a walking, running, or sports shoe. Variations of the devices disclosed in this provisional can also be used in non-shoe related applications such as sporting goods or industrial mechanisms which require, for example, a decreasing spring force. One of many possible examples would be the use of a decreasing spring force component according to an embodiment of the present invention to provide an increasing/decreasing spring rate to tension an archery bow string. This would simplify the present pulley system that is used in compound bows. Many other applications for the present invention such as, but not limited to suspension system components and variable spring actuators for various linkage systems are conceivable.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

Immaterial modifications may be made to the embodiments described here without departing from what is covered by the claims.

What is claimed is:

1. A spring shoe, comprising:
   a sole having a heel and a forefoot;
   an upper secured to the sole;
   a spring positioned in the sole, the spring having a spring range of travel under compression of the sole by a foot supported by the spring shoe, the spring range of travel extending between end points;
   the spring comprising a disk and a ring spring extending along a periphery of the disk, the disk comprising a rigid element and the ring spring comprising an elastic element, the ring spring and the disk being connected together to oppose flattening of the disk;
   the spring having a spring rate that is zero at a point between the end points of the range of travel; and
   a biased damper in the sole and disposed within the spring, the biased damper being oriented to oppose compression of the sole and dissipate energy as the spring compresses beyond the point of zero spring rate and towards maximum compression; wherein the biased damper applies a force to the spring to resist compression of the spring; wherein the force increases as the spring compresses beyond the point of zero spring rate.

2. The spring shoe of claim 1 in which the force resisting compression increases as the spring approaches full compression.

3. The spring shoe of claim 1 in which the biased damper has a damping range of travel, and the damping range of travel is less than the spring range of travel.

4. The spring shoe of claim 3 in which the biased damper comprises an energy dissipating compressible material.

5. The spring shoe of claim 3 in which the biased damper comprises an energy dissipating deformable material.

6. The spring shoe of claim 1 in which the disk comprises an air chamber having conduits allowing air to flow into and out of the air chamber.

7. The spring shoe of claim 6 in which the air chamber has an air flow regulator element that restricts air flow out of the air chamber more than air flow into the air chamber.

8. The spring shoe of claim 1 where the rigid element is loaded in compression, and the elastic element is loaded in tension.

9. The spring shoe of claim 1 in which the disk has an apex and has at least a hinge or is flexible at the apex to allow the rigid element to flatten upon force being applied to the apex.

10. The spring shoe of claim 1 in which the elastic element is embedded within an opening which extends along the periphery of the rigid element.

11. The spring shoe of claim 1 in which the rigid element is air sealed.

12. The spring shoe of claim 1 in which the disk comprises a conical disk.

13. The spring shoe of claim 12 in which the conical disk incorporates blind slots.

14. The spring shoe of claim 1 in which the rigid element comprises a hinge.

15. The spring shoe of claim 14 in which the hinge is a living hinge.

16. The spring shoe of claim 1 in which the rigid element has at least a living hinge.

17. The spring shoe of claim 1 in which the elastic element comprises an acetal resin.

18. The spring shoe of claim 1 in which the spring has maximum force resisting compression at greater than 30% of the spring range of travel measured from zero compression of the spring.

19. The spring shoe of claim 1 in which the spring is located in the heel of the sole.

20. The spring shoe of claim 1 in which the spring is located in the forefoot of the sole.

21. The spring shoe of claim 1, in which the spring rate declines for at least part of the range of travel as the spring compresses.

22. The spring shoe of claim 1 in which the conical disk incorporates expansion slots.

23. The spring shoe of claim 22 in which the conical disk incorporates blind slots.

24. The spring shoe of claim 23 in which the blind slots are radially extending.

25. The spring shoe of claim 22 in which the conical disk incorporates radially extending blind slots.

26. The spring shoe of claim 13 in which the blind slots are radially extending.

* * * * *